(12) United States Patent
Jeong

(10) Patent No.: US 10,821,953 B2
(45) Date of Patent: Nov. 3, 2020

(54) ELECTRIC BRAKING SYSTEM AND OPERATION METHOD THEREOF

(71) Applicant: MANDO CORPORATION, Gyeonggi-do (KR)

(72) Inventor: Hyojin Jeong, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 90 days.

(21) Appl. No.: 16/143,464

(22) Filed: Sep. 27, 2018

(65) Prior Publication Data

US 2019/0100185 A1 Apr. 4, 2019

(30) Foreign Application Priority Data

Sep. 29, 2017 (KR) .................. 10-2017-0127510

(51) Int. Cl.
| | | |
|---|---|---|
| *B60T 13/68* | (2006.01) | |
| *B60T 13/66* | (2006.01) | |
| *B60T 7/04* | (2006.01) | |
| *B60T 13/14* | (2006.01) | |
| *B60T 8/40* | (2006.01) | |

(52) U.S. Cl.
CPC ............ *B60T 13/686* (2013.01); *B60T 7/042* (2013.01); *B60T 8/4081* (2013.01); *B60T 13/145* (2013.01); *B60T 13/662* (2013.01)

(58) Field of Classification Search
CPC ..... B60T 13/686; B60T 7/042; F16K 31/0675
See application file for complete search history.

(56) References Cited

U.S. PATENT DOCUMENTS

| 10,457,261 | B2* | 10/2019 | Jeon ...................... B60T 13/142 |
|---|---|---|---|
| 2013/0213025 | A1* | 8/2013 | Linden .................. B60T 8/4018 60/327 |
| 2014/0028083 | A1* | 1/2014 | Gerdes ...................... B60T 1/10 303/6.01 |
| 2015/0021981 | A1* | 1/2015 | Shimada ............... B60T 13/146 303/121 |
| 2015/0175146 | A1* | 6/2015 | Quirant ................. B60T 13/662 303/14 |

(Continued)

FOREIGN PATENT DOCUMENTS

EP 2 520 473 11/2012

OTHER PUBLICATIONS

Extended European Search Report dated Feb. 5, 2019 for European Patent Application No. 18197639.0.

(Continued)

*Primary Examiner* — Thomas J Williams
*Assistant Examiner* — James K Hsiao
(74) *Attorney, Agent, or Firm* — Ladas & Parry, LLP

(57) ABSTRACT

Disclosed is an electronic braking system and operation method thereof. The electronic braking system and operation method thereof includes a hydraulic pressure supplier configured to create hydraulic pressure by moving a hydraulic piston based on an electric signal output to correspond to displacement of a brake pedal, and a hydraulic controller configured to control hydraulic pressure of a pressure medium applied to each wheel cylinder, and performs normal operation mode, abnormal operation mode, regenerative braking mode, and check mode by controlling a plurality of valves equipped in the hydraulic controller.

20 Claims, 12 Drawing Sheets

(56) References Cited

U.S. PATENT DOCUMENTS

2016/0159331 A1* 6/2016 Yang .................... B60T 13/142
                                                    303/15
2016/0159332 A1* 6/2016 Yang .................... B60T 13/142
                                                    303/15
2016/0214591 A1* 7/2016 Yang .................... B60T 13/686
2016/0221560 A1* 8/2016 Yang .................... B60T 13/686
2017/0144644 A1   5/2017 Kim et al.
2017/0158180 A1* 6/2017 Kim ..................... B60T 13/745
2017/0210369 A1   7/2017 Lim et al.
2019/0100185 A1* 4/2019 Jeong ................... B60T 8/4081
2019/0100186 A1   4/2019 Jeong et al.

OTHER PUBLICATIONS

Extended European Search Report dated Feb. 5, 2019 for European Patent Application No. 18197627.5.

* cited by examiner

ELECTRIC BRAKING SYSTEM AND OPERATION METHOD THEREOF

CROSS-REFERENCE TO RELATED APPLICATION

This application is based on and claims priority under 35 U. S. C. § 119 to Korean Patent Application No. 10-2017-0127510 filed on Sep. 29, 2017, in the Korean Intellectual Property Office, the disclosure of which is incorporated herein by reference in its entirety.

BACKGROUND

1. Field of the Invention

The present disclosure relates to an electric braking system and operation method thereof, and more particularly, to an electric braking system and operation method thereof, which generates braking force using an electric signal corresponding to the displacement of the brake pedal.

2. Discussion of Related Art

It is essential for vehicles to be equipped with a braking system to perform braking, and various types of braking systems are proposed for the safety of drivers and passengers.

The conventional braking system mainly employs a method of using a booster mechanically coupled to the brake pedal to apply hydraulic pressure required for braking to the wheel cylinder when the driver puts on the brake pedal. As the market requirements grow to realize various braking functions to finely correspond to an operating environment of the vehicle, electronic braking systems are widely used these days. The electronic braking system includes a hydraulic pressure supplier that receives the driver's intention of braking as an electric signal from a pedal displacement sensor for detecting displacement of the brake pedal when the driver puts on the brake pedal and applies the hydraulic pressure required for braking to a wheel cylinder.

In a normal operation mode of the electronic braking system, activation of the brake pedal by the driver leads to generating and providing electric signals, based on which the hydraulic pressure supplier is electrically operated and controlled to create and transfer the hydraulic pressure required for braking to the wheel cylinder. While the electronic braking system may implement various complicated braking operations because it is electrically operated and controlled, it might threaten the safety of passengers if technical problems occur in the electric parts of the vehicle and might fail to stably create the hydraulic pressure for braking.

The electronic braking system enters into an abnormal operation mode if a part has an error or runs out of control, and in the abnormal operation mode, a mechanism in which the operation of the brake pedal by the driver has to be directly interlocked with the wheel cylinder is required. In other words, in the abnormal operation mode of the electronic braking system, as the driver applies a pedal effort to the brake pedal, the hydraulic pressure required for braking needs to be immediately created and transferred directly to the wheel cylinder.

In the meantime, as the market requirements for echo-friendly vehicles grow, hybrid-type vehicles have become more and more popular. Typically, the hybrid vehicle refers to a vehicle that allows kinetic energy to be retrieved as electric energy during braking, stores the electric energy in a battery, and secondarily uses the stored electric energy in driving the vehicle. The hybrid vehicle is becoming popular because it has the benefit of enhanced fuel efficiency.

The hybrid vehicle retrieves energy by means of a generator during braking of the vehicle to increase the energy retrieval rate, and this operation of braking is called regenerative braking. However, the regenerative braking affects distribution of braking force to be applied to a plurality of wheels of the vehicle, causing the vehicle to suffer from oversteering, understeering, or slippage, thereby hindering driving stability of the vehicle.

REFERENCE

EP 2 520 473 A1 (Honda Motor Co., Ltd.) published on Nov. 7, 2012

SUMMARY OF THE INVENTION

The present disclosure provides an electronic braking system and operation method thereof, capable of stably distributing and providing braking pressure to wheel cylinders even during regenerative braking.

The present disclosure also provides an electronic braking system and operation method thereof, capable of reducing braking pressure on wheels even during regenerative braking.

The present disclosure also provides an electronic braking system and operation method thereof, capable of effectively performing braking in various operation situations.

The present disclosure also provides an electronic braking system and operation method thereof, capable of facilitating driving stability of the vehicle.

The present disclosure also provides an electronic braking system and operation method thereof, capable of stably generating high braking pressure.

The present disclosure also provides an electronic braking system and operation method thereof with enhanced performance and operation reliability.

The present disclosure also provides an electronic braking system and operation method thereof, capable of reducing load applied on a part, thereby improving product durability.

The present disclosure also provides an electronic braking system and operation method thereof, capable of reducing the product size and the number of parts of the product.

In accordance with an aspect of the present disclosure, an electronic braking system is provided. The electronic braking system includes a hydraulic pressure supplier configured to create hydraulic pressure by moving a hydraulic piston movably contained in a cylinder block based on an electric signal output to correspond to displacement of a brake pedal and have a first pressure chamber formed on one side of the hydraulic piston and a second pressure chamber formed on the other side of the hydraulic piston; and a hydraulic controller configured to have a first hydraulic circuit controlling hydraulic pressure transferred to two wheel cylinders and a second hydraulic circuit controlling hydraulic pressure transferred to other two wheel cylinders, wherein the hydraulic controller may include a first hydraulic flow path linked to the first pressure chamber, second and third hydraulic flow paths branched from the first hydraulic flow path and coupled to the first and second hydraulic circuits, respectively, a fourth hydraulic flow path linked to the second pressure chamber and coupled to the third hydraulic flow path, fifth and sixth hydraulic flow paths branched from a point in the fourth hydraulic flow path and joining at the point again, and a seventh hydraulic flow path connecting the second and third hydraulic flow paths.

The hydraulic controller may include a first valve arranged in the second hydraulic flow path and between a point coupled to the seventh hydraulic flow path and the first pressure chamber to control the flow of a pressure medium, a second valve arranged in the second hydraulic flow path and between a point coupled to the seventh hydraulic flow path and the first hydraulic circuit to control the flow of a pressure medium, a third valve arranged in the third hydraulic flow path to control the flow of a pressure medium, a fourth valve arranged in the fifth hydraulic flow path to control the flow of a pressure medium, and a fifth valve arranged in the sixth hydraulic flow path to control the flow of a pressure medium.

The first, second, and fourth valves may be provided as solenoid valves to control bidirectional flows of a pressure medium, the third valve may be provided as a check valve to allow a flow of a pressure medium in a direction from the first pressure chamber to the second hydraulic circuit, and the fifth valve may be provided as a check valve to allow a flow of a pressure medium in a direction from the second pressure chamber to a point coupled to the third hydraulic flow path.

The electronic braking system may further include a generator provided for two wheel cylinders of the first hydraulic circuit.

The first hydraulic circuit may include first and second inlet valves configured to control hydraulic pressure applied to the two wheel cylinders, respectively, and first and second outlet valves configured to control hydraulic pressure discharged from the two wheel cylinders to a reservoir storing a pressure medium, respectively, and at least one of the first and second outlet valves is provided as an analog type valve.

The electronic braking system may further include a first dump flow path connecting the first pressure chamber and the reservoir; a second dump flow path connecting the second pressure chamber and the reservoir; a first dump valve arranged in the first dump flow path to control the flow of a pressure medium such that a flow of the pressure medium in a direction from the reservoir to the first pressure chamber is allowed; a second dump valve arranged in the second dump flow path to control the flow of a pressure medium such that a flow of the pressure medium in a direction from the reservoir to the second pressure chamber is allowed; and a third dump valve arranged in a bypass flow path coupled in parallel with the second dump valve in the second dump flow path to control the flow of a pressure medium and provided as a solenoid valve to control bidirectional flows of the pressure medium between the reservoir and the second pressure chamber.

The electronic braking system may further include a master cylinder having first and second master chambers and first and second pistons arranged inside the first and second master chambers, respectively, and configured to discharge a pressure medium in response to a pedal effort on the brake pedal; and a reservoir flow path connecting the reservoir and the master cylinder.

The reservoir flow path may include a first reservoir flow path connecting the first master chamber and the reservoir, a second reservoir flow path connecting the second master chamber and the reservoir, a reservoir check valve arranged in the first reservoir flow path to control the flow of a pressure medium such that a flow of the pressure medium in a direction from the reservoir to the first master chamber is allowed, and a check valve arranged in a bypass flow path coupled in parallel with the reservoir check valve in the first reservoir flow path to control the flow of a pressure medium and provided as a solenoid valve to control bidirectional flows of the pressure medium between the first master chamber and the reservoir.

The electronic braking system may further include a first backup flow path connecting the first master chamber and the first hydraulic circuit; a second backup flow path connecting the second master chamber and the second hydraulic circuit; a first cut valve arranged in the first backup flow path to control the flow of a pressure medium; and a second cut valve arranged in the second backup flow path to control the flow of a pressure medium.

The electronic braking system may further include a simulation device coupled to the master cylinder to provide reaction force against a pedal effort on the brake pedal; and a simulator valve configured to open or close a flow path between the master cylinder and the simulation device.

The second hydraulic circuit may include third and fourth inlet valves configured to control hydraulic pressure applied to the other two wheel cylinders, respectively, and third and fourth outlet valves configured to control hydraulic pressure discharged from the other two wheel cylinders to the reservoir, respectively.

In accordance with another aspect of the present disclosure, an operation method of an electronic braking system is provided. The operation method includes a normal operation mode sequentially operated with a low pressure mode to apply relatively low hydraulic pressure and a high pressure mode to apply relatively high hydraulic pressure, based on a hydraulic pressure level transferred to the wheel cylinder from the hydraulic pressure supplier.

The low pressure mode may be configured to open the first and second valves, and apply hydraulic pressure created in the first pressure chamber from a forward movement of the hydraulic piston to the first and second hydraulic circuits.

The high pressure mode may be configured to open the first and second valves, apply some of hydraulic pressure created in the first pressure chamber from a forward movement of the hydraulic piston after the low pressure mode to the first and second hydraulic circuits, open the fourth valve, and apply the rest of the hydraulic pressure created in the first pressure chamber to the second pressure chamber.

The operation method may further include releasing the low pressure mode by opening the first and second valves, and creating negative pressure in the first pressure chamber from a backward movement of the hydraulic piston and retrieving a pressure medium of the first and second hydraulic circuits into the first pressure chamber.

The operation method may further include releasing the high pressure mode by opening the first and second valves, creating negative pressure in the first pressure chamber from a backward movement of the hydraulic piston and retrieving a pressure medium of the first and second hydraulic circuits into the first pressure chamber, opening the fourth valve, and supplying a pressure medium of the second pressure chamber to the first pressure chamber.

In accordance with another aspect of the present disclosure, an operation method of an electronic braking system is provided. The operation method includes a normal operation mode having a regenerative braking mode in which two wheel cylinders arranged in the first hydraulic circuit perform regenerative braking with the generator, wherein in the regenerative braking mode, hydraulic pressure is blocked from being transferred to the first hydraulic circuit by closing the second valve.

The operation method may further include, in the regenerative braking mode, controlling an extent of opening of the first and second outlet valves to control braking pressure applied to the two wheel cylinders arranged in the first hydraulic circuit.

In accordance with another aspect of the present disclosure, an operation method of an electronic braking system is provided. The operation method includes an abnormal operation mode configured to link the first master chamber and the first hydraulic circuit by opening the first cut valve and link the second master chamber and the second hydraulic circuit by opening the second cut valve.

In accordance with another aspect of the present disclosure, an operation method of an electronic braking system is provided. The operation method includes a check mode configured to check whether there is a leakage in the master cylinder or the simulator valve, wherein in the check mode, the second cut valve is closed and the first cut valve is opened, the hydraulic pressure supplier is operated to create and apply hydraulic pressure to the first master chamber, and a value of hydraulic pressure of a pressure medium expected based on an amount of displacement of the hydraulic piston and a value of hydraulic pressure of a pressure medium applied to the first master chamber are compared.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
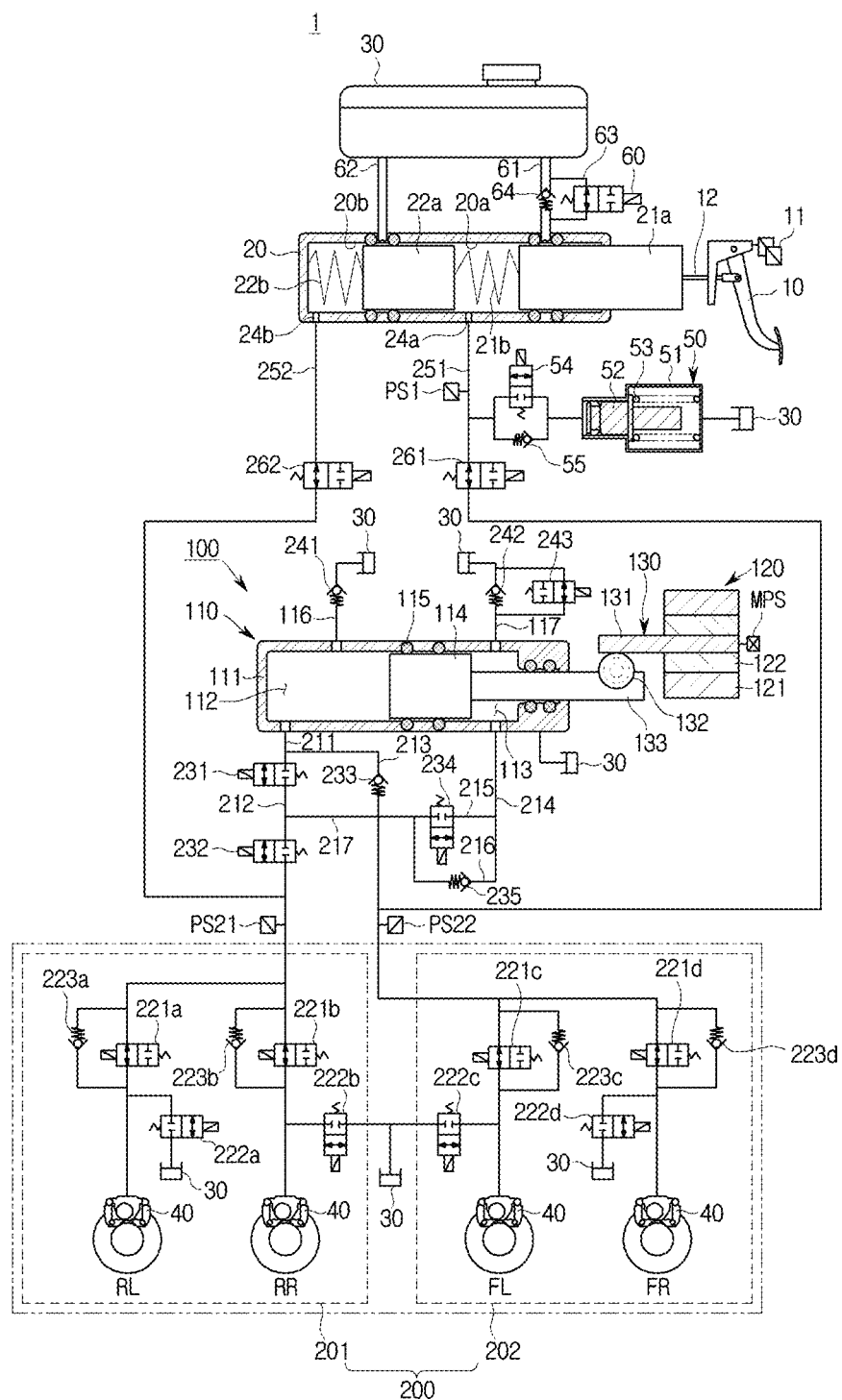
FIG. 1 is a hydraulic circuit diagram illustrating an electronic braking system, according to an embodiment of the present disclosure.

Reference will now be made in detail to embodiments, examples of which are illustrated in the accompanying drawings. Embodiments as will be described below are suggested to fully deliver an idea of the present disclosure to ordinary skilled people in the art. The present disclosure may not be limited thereto but may be implemented in any other forms. In the drawings, well-known or unrelated components may be omitted for clarity and conciseness, and some components may be exaggerated in terms of their dimensions for better understanding.

FIG. 1 is a hydraulic circuit diagram illustrating an electronic braking system 1, according to an embodiment of the present disclosure.

Referring to FIG. 1, the electronic braking system 1 may include a master cylinder 20 configured to pressurize and discharge a pressure medium, such as brake oil contained inside in response to a pedal effort on a brake pedal 10, a reservoir 30 linked to the master cylinder 20 and storing the pressure medium, a wheel cylinder 40 configured to receive hydraulic pressure of the pressure medium to perform braking of each wheel RR, RL, FR, and FL, a simulation device 50 configured to apply reaction force to the driver in response to a pedal effort on the brake pedal 10, a hydraulic pressure supplier 100 configured to receive a braking intention of the driver as an electric signal from a pedal displacement sensor 11 that detects displacement of the brake pedal 10, a hydraulic controller 200 configured to control hydraulic pressure transmitted to the wheel cylinder 40, and an electronic control unit (ECU, not shown) configured to control the hydraulic pressure supplier 100 and various valves based on information about hydraulic pressure and pedal displacement.

The master cylinder 20 may be equipped with at least one chamber to pressurize and discharge the pressure medium inside the chamber. Specifically, the master cylinder 20 may include a first master chamber 20*a* and a second master chamber 20*b*, and a first piston 21*a* and a second piston 22*a* provided in the first and second master chambers 20*a* and 20*b*, respectively.

More specifically, the first master chamber 20*a* is equipped with the first piston 21*a* coupled to an input load 12, and the second master chamber 20*b* is equipped with the second piston 22*a*. The pressure medium may be moved into or discharged from the first master chamber 20*a* through a first hydraulic port 24*a*, and the pressure medium may be moved into or discharged from the second master chamber 20*b* through a second hydraulic port 24*b*. For example, the first hydraulic port 24a may be coupled to a first backup flow path 251, as will be described later, and the second hydraulic port 24b may be coupled to a second backup flow path 252, as will be described later.

In this embodiment, the master cylinder 20 may secure safety in case of part failure because the master cylinder 20 is equipped with two independent master chambers 20a and 20b. For example, of the two master chambers 20a and 20b, one master chamber 20a may be coupled to front left and front right wheels (FL and FR) of the vehicle, and the other master chamber 20b may be coupled to rear left and rear right wheels (RL and RR) of the vehicle. Accordingly, even if one of the master chambers has an error, braking of the vehicle may be possible.

Unlike what is shown in FIG. 1, one of the two master chambers may be coupled to the rear right wheel RR and the front left wheel FL, and the other master chamber may be coupled to the rear left wheel RL and the front right wheel FR. Alternatively, one of the two master chambers may be coupled to the front left wheel FL and the rear left wheel RL, and the other master chamber may be coupled to the rear right wheel RR and the front right wheel FR. That is, which wheels are coupled to which master chamber of the master cylinder 20 may be variously set.

A first spring 21b may be provided between the first and second pistons 21a and 22a, and a second spring 22b may be provided between the second piston 22a and the end of the master cylinder 20. In other words, the first piston 21a may be contained in the first master chamber 20a and the second piston 22a may be contained in the second master chamber 20b.

The first and second springs 21b and 22b are constricted when the first and second pistons 21a and 22a are moved as the driver puts on the brake pedal 10 to change the displacement. When the pedal effort (or pedal force) of the brake pedal 10 is released, the first and second springs 21b and 22b elastically expand to force the first and second pistons 21a and 22a to return to their original positions.

The brake pedal 10 and the first piston 21a of the master cylinder 20 may be coupled by the input load 12. The input load 12 may be directly coupled to the first piston 21a, or may come into close contact with the first piston 21a without a gap so that when the driver puts on the brake pedal 10, the master cylinder 20 may be directly pressurized without an invalid pedal stroke section.

The first master chamber 20a may be coupled to the reservoir 30 through a first reservoir flow path 61, and the second master cylinder 20b may be coupled to the reservoir 30 through a second reservoir flow path 62. In the first reservoir flow path 61, there is a check valve 64 arranged to allow the flow of the pressure medium into the first master chamber 20a from the reservoir 30 and block the flow of the pressure medium into the reservoir 30 from the first master chamber 20a. In other words, the check valve 64 may be arranged to allow only the flow of the pressure medium in a direction from the reservoir 30 to the first master chamber 20a.

Furthermore, in the first reservoir flow path 61, there may also be a check flow path 63 coupled in parallel to the check valve 64. Specifically, the check flow path 63 may be provided as a bypass flow path that connects the front end and the back end of the check valve 64 with a detour in the first reservoir flow path 61, and there may be a check valve 60 in the check flow path 63 provided as the bypass flow path to control the flow of the pressure medium.

The check valve 60 may be provided as a bidirectional valve to control the flow of the pressure medium between the reservoir 30 and the master cylinder 20. The check valve 60 is provided as a normal open type of solenoid valve that is normally open but closed when receiving an electric signal from the ECU as will be described later. Functions and operation of the check valve 60 will be described in more detail later.

The master cylinder 20 may include two sealing members arranged in front and back of the first reservoir flow path 61 and two sealing members arranged in front and back of the second reservoir flow path 62. The sealing member may have the form of a ring that protrudes from the inner wall of the master cylinder 20 or the outer circumferential face of the piston 21a or 22a.

The simulation device 50 may be coupled to the first backup flow path 251 as will be described later, and may apply reaction force to the driver in response to a pedal force of the brake pedal 10. As the simulation device 50 provides the reaction force in response to the driver applying the pedal force on the brake pedal 10, a pedal feeling is provided for the driver to help him/her fine-tune the brake pedal 10 and thus the braking force of the vehicle.

The simulation device 50 may include a simulation chamber 51 provided to contain the pressure medium discharged from the first hydraulic port 24a of the master cylinder 20, a reaction piston 52 provided in the simulation chamber 51, a pedal simulator equipped with a reaction spring 53 elastically supporting the reaction piston 52, and a simulator valve 54 provided in the front of the simulation chamber 51.

The reaction piston 52 and the reaction spring 53 are provided to have a certain range of displacement in the simulation chamber 51 due to the pressure medium moving into the simulation chamber 51, and the simulation valve 54 may connect the first master chamber 20a of the master cylinder 20 and the front end of the simulation chamber 51 with the rear end of the simulation chamber 51 connected to the reservoir 30. Accordingly, the simulation chamber 51 may always be filled with the pressure member because the pressure member is moved thereto even if the reaction piston 52 returns.

The reaction spring 53 shown in the drawing is merely an example of providing elastic force to the reaction piston 52, but may have other various structures that may store elastic force. For example, the reaction spring 53 may be made of a material, such as rubber, and may have the figure of coil or plate to store the elastic force.

The simulator valve 54 may be provided in a flow path connecting the first master chamber 20a of the master cylinder 20 and the front end of the simulation chamber 51. The simulator valve 54 may be provided as a normal closed type of solenoid valve that remains normally closed. The simulator valve 54 is opened when the driver applies a pedal force on the brake pedal 10 and operated such that the pressure medium in the first master chamber 20a is transmitted to the simulation chamber 51.

There may be a simulator check valve 55 coupled in parallel to the simulator valve 54 in the flow path connecting the first master chamber 20a of the master cylinder 20 and the front end of the simulation chamber 51. Specifically, since the simulation device 50 is coupled to the first master chamber 20a of the master cylinder 20 by a flow path branched from the first backup flow path 251 as will be described later, the simulator check valve 55 is configured to allow the flow of the pressure medium from the simulation chamber 51 to the first master chamber 20a or the first backup flow path 251 while blocking the flow of the pressure medium from the first master chamber 20a or the first backup flow path 251 to the simulation chamber 51. Accordingly, when the driver applies pedal force on the brake pedal 10, the pressure medium in the first master chamber 20a is moved into the simulation chamber 51 through the simulator valve 54, and when the pedal force on the brake pedal 10 is released, the pressure medium in the simulation chamber 51 is moved into the first master chamber 20a or the first backup flow path 251 through the simulator valve 54 and the simulator check valve 55, thereby facilitating a quick return of simulator pressure. Further, even if the hydraulic pressure of the simulation chamber 51 is higher than that of the pressure medium in the first master chamber 20a or the first backup flow path 251, the simulation device 50 may quickly return to a state of being ready for operation as the pressure medium in the simulation chamber 51 is discharged into the first master chamber 20a or the first backup flow path 251 through the simulator check valve 55.

As for the operation of the simulation device 50, when the driver applies pedal force on the brake pedal 10, the simulator valve is opened and the pressure medium in the first master chamber 20a is supplied to the front of the reaction piston 52 (to the left of the reaction piston 52 in the drawing) in the simulation chamber 51, forcing the reaction piston 52 to compress the reaction spring 53 and thus giving the pedal feeling to the driver. At this time, the pressure medium having filled the back of the reaction piston 52 (the right side of the reaction piston 52 in the drawing) in the simulation chamber 51 is transmitted to the reservoir 30. Afterwards, when the driver releases the pedal force from the brake pedal 10, the reaction spring 53 elastically expands to force the reaction piston 52 to be returned to its original position and the pressure medium having filled the front of the reaction piston 52 in the simulation chamber 51 is discharged into the first master chamber 20a or the first backup flow path 251 through the simulator valve 54 and the simulator check valve 55. At this time, the pressure medium is supplied to the back of the reaction piston 52 in the simulation chamber 51 from the reservoir 30, so the simulation chamber 51 may be filled again with the pressure medium.

As such, since the simulation chamber 51 is always filled with the pressure medium, friction of the reaction piston 52 may be minimized while the simulation device 50 is working, thereby enhancing durability of the simulation device 50 as well as blocking inflow of foreign substances from the outside.

In the drawings, a plurality of reservoirs 30 are shown with the same reference numeral. The reservoirs may be provided with the same or different parts. For example, the reservoir 30 coupled to the simulation device 50 may be the same as the reservoir 30 coupled to the master cylinder 20, or may be a reservoir capable of storing the pressure medium separately from the reservoir 30 coupled to the master cylinder 20.

The hydraulic pressure supplier 100 configured to receive a braking intention of the driver as an electric signal from a pedal displacement sensor 11 that detects displacement of the brake pedal 10 and mechanically operate to generate the hydraulic pressure of the pressure medium.

The hydraulic pressure supplier 100 may include a hydraulic pressure supplying unit 110 for applying pressure of the pressure medium transmitted to the wheel cylinder 40, a motor 120 for generating rotational force according to an electric signal from the pedal displacement sensor 11, and a power converter 130 for converting rotation of the motor 120 to linear motion and transferring the linear motion to the hydraulic pressure supplying unit 110. The hydraulic pressure supplying unit 110 may also be operated by the pressure applied from a high pressure accumulator instead of the driving force supplied from the motor 120.

The hydraulic pressure supplying unit 110 includes a cylinder block 111 equipped with a pressure chamber for receiving and storing the pressure medium, a hydraulic piston 114 contained in the cylinder block 111, a sealing member arranged between the hydraulic piston 114 and the cylinder block 111 to seal the pressure chamber, and a driving shaft 133 for transferring the power output from the power converter 130 to the hydraulic piston 114.

The pressure chamber may include a first pressure chamber 112 located in front of the hydraulic piston 114 (on the left of the hydraulic piston 114 in the drawing, which is in a forward direction), and a second pressure chamber 113 located behind the hydraulic piston 114 (on the right of the hydraulic piston 114 in the drawing, which is in a backward direction). Specifically, the first pressure chamber 112 is defined by the cylinder block 111 and the front end of the hydraulic piston 114 such that the volume is changed by the movement of the hydraulic piston 114, and the second pressure chamber 113 is defined by the cylinder block 111 and the rear end of the hydraulic piston 114 such that the volume is changed by the movement of the hydraulic piston 114.

The first pressure chamber 112 is coupled to a first hydraulic flow path 211, which will be described later, through a first link hole formed on the cylinder block 111, and the second pressure chamber 113 is coupled to a fourth hydraulic flow path 214, which will be described later, through a second link hole formed on the cylinder block 111.

The sealing member includes a piston sealing member 115 provided between the hydraulic piston 114 and the cylinder block 111 to seal the gap between the first pressure chamber 112 and the second pressure chamber 113, and a driving shaft sealing member provided between the driving shaft 133 and the cylinder block 111 to seal an opening of the cylinder block 111 and the second pressure chamber 113. The hydraulic pressure or negative pressure of the first and second pressure chambers 112 and 113 generated by forward or backward movement of the hydraulic piston 114 may be sealed by the piston sealing member 115 and transferred to the first and fourth hydraulic flow paths 211 and 214 without being leaked into the second pressure chamber 113, and the hydraulic pressure of negative pressure of the second pressure chamber 113 generated by forward or backward movement of the hydraulic piston 114 may be sealed by the driving shaft sealing member without being leaked out of the cylinder block 111.

The first and second pressure chambers 112 and 113 are coupled to the reservoir 30 by first and second dump flow paths 116 and 117, and receive and contain the pressure medium from the reservoir 30 along the first and second dump flow paths 116 and 117 or transmit the pressure medium of the first or second pressure chamber 112 or 113 to the reservoir 30. For this, the first dump flow path 116 may be linked to the first pressure chamber 112 through a third link hole formed on the cylinder block 111 and coupled to the reservoir 30, and the second dump flow path 117 may be linked to the second pressure chamber 113 through a fourth link hole formed on the cylinder block 111 and coupled to the reservoir 30.

The motor 120 is provided to generate driving force according to an electric signal output from the ECU. The motor 120 may include a stator 121 and a rotor 122 to be rotated forward direction or reverse direction to provide power, which causes displacement of the hydraulic piston 114. The rotational angular velocity and rotation angle of the motor 120 may be fine-controlled by a motor control sensor or motor position sensor (MPS). The motor 120 is well-known to the public, so the detailed description thereof will be omitted herein.

The power converter 130 is configured to convert the rotational force of the motor 120 to linear motion. The power converter 130 may have a structure including, for example, a worm shaft 131, a worm wheel 132, and the driving shaft 133.

The worm shaft 131 may be integrally formed with the rotation shaft of the motor 120, and may have the worm formed on the outer circumferential face to be coupled in gear with the worm wheel 132 to rotate the worm wheel 132. The worm wheel 132 may be coupled in gear with the driving shaft 133 to linearly move the driving shaft 133, and the driving shaft is coupled with the hydraulic piston 114, which may in turn slide inside the cylinder block 111.

In other words, when the displacement of the brake pedal 10 is detected by the pedal displacement sensor 11, the detection signal is sent to the ECU, which in turn, drives the motor 120 to rotate the worm shaft 131 in a direction. The rotational force of the worm shaft 131 is transferred to the driving shaft 133 through the worm wheel 132, and the hydraulic piston 114 coupled to the driving shaft 133 moves forward inside the cylinder block 111, creating hydraulic pressure in the first pressure chamber 112.

On the contrary, when the pedal force on the brake pedal 10 is released, the ECU drives the motor 120 to rotate the worm shaft 131 in the reverse direction. Accordingly, the worm wheel 132 is also rotated in the reverse direction and the hydraulic piston 114 coupled to the driving shaft 133 moves backward inside the cylinder block 111, creating negative pressure in the first pressure chamber 112.

Creation of the hydraulic pressure and the negative pressure in the second pressure chamber 113 may work the other way around. In other words, when the displacement of the brake pedal 10 is detected by the pedal displacement sensor 11, the detection signal is sent to the ECU, which in turn, drives the motor 120 to rotate the worm shaft 131 in the reverse direction. The rotational force of the worm shaft 131 is transferred to the driving shaft 133 through the worm wheel 132, and the hydraulic piston 114 coupled to the driving shaft 133 moves backward inside the cylinder block 111, creating hydraulic pressure in the second pressure chamber 113.

On the contrary, when the pedal force on the brake pedal 10 is released, the ECU drives the motor 120 in a direction to rotate the worm shaft 131 in the direction. Accordingly, the worm wheel 132 is also rotated the other way around and the hydraulic piston 114 coupled to the driving shaft 133 moves forward inside the cylinder block 111, creating negative pressure in the second pressure chamber 113.

As such, the hydraulic supplier 100 may create hydraulic pressure or negative pressure in each of the first and second pressure chambers 112 and 113 depending on the rotational direction of the worm shaft 131 operated by the motor 120, and may determine whether to apply the brakes by transferring the hydraulic pressure or to release the brake by using the negative pressure by controlling the valves. This will be described in more detail later.

Although not shown, the power converter 130 may have a ball screw nut assembly. For example, the power converter 130 may include a screw integrally formed with the rotation shaft of the motor 120 or coupled and rotated along with the rotation shaft of the motor 120 and a ball nut fastened with the screw in a state of limited rotation and moved linearly as the screw rotates. This ball screw nut assembly structure is well known to the public, so the description thereof will be omitted herein. The power converter 130 is not limited to having a particular structure as long as it may convert rotational motion to linear motion, so it may have other various structures and types of devices.

The hydraulic controller 200 may be configured to control the hydraulic pressure transferred to the wheel cylinder 40, and the ECU may be configured to control the hydraulic pressure supplier 100 and various valves based on information about the hydraulic pressure and pedal displacement.

The hydraulic controller 200 may include a first hydraulic circuit 201 for controlling the flow of hydraulic pressure transferred to two wheel cylinders 40 and a second hydraulic circuit 202 for controlling the flow of hydraulic pressure transferred to the other two wheel cylinders 40, and may include a number of flow paths and valves to control the hydraulic pressure transferred to the wheel cylinder 40 from the master cylinder 20 and the hydraulic pressure supplier 100.

Turning back to FIG. 1, the hydraulic controller 200 will now be described.

Referring to FIG. 1, the first hydraulic flow path 211 is arranged to connect the first pressure chamber 112 and the first and second hydraulic circuits 201 and 202. The first hydraulic circuit 211 is branched into the second and third hydraulic flow paths 212 and 213, the second hydraulic flow path 212 connected to the first hydraulic circuit 201 and the third hydraulic flow path 213 connected to the second hydraulic circuit 202. With this structure, the hydraulic pressure created on the first pressure chamber 112 from the forward movement of the hydraulic piston 114 may be transferred to the first hydraulic circuit 201 through the first and second hydraulic flow paths 211 and 212, and to the second hydraulic circuit 202 through the first and third hydraulic flow paths 211 and 213.

In the second hydraulic flow path 212, there may be first and second valves 231 and 232 sequentially arranged to control the flow of the pressure medium. The first valve 231 may be arranged in front of a point at which a seventh hydraulic flow path 217, which will be described later, joins and the second valve 232 may be arranged behind the point that joins the seventh hydraulic flow path 217. The first and second valves 231 and 232 may be provided as bidirectional valves to control the flow of the pressure medium transmitted through the second flow path 212, and may be a normal closed type of solenoid valves that are normally closed but operate to be opened when receiving an electric signal from the ECU.

The second valve 232 is arranged between a pressure chamber of a hydraulic pressure generator and a wheel cylinder to implement regenerative braking for selectively connecting and disconnecting the pressure chamber and the hydraulic circuit of interest such that the hydraulic pressure of the pressure medium may be transferred only in part to the wheel cylinder. For example, as shown in FIG. 1, the second valve 232 may be arranged in the second hydraulic flow path 212 between the first pressure chamber 112 and the first hydraulic circuit 201 in which the wheel cylinders 40 of the rear wheels RL and RR are installed to implement rear wheel regenerative braking, for selectively connecting and disconnecting the first pressure chamber 112 and the first hydraulic circuit 201 such that the hydraulic pressure of the pressure medium may be transferred only in part to the rear wheel cylinder 40 of the first hydraulic circuit 201. This will be described in more detail later.

In the third hydraulic flow path 213, there may be a third valve 233 arranged to control the flow of the pressure medium. The third valve 233 may be configured as a check valve that allows the flow of the pressure medium in a direction from the first pressure chamber 112 to the second hydraulic circuit 202 while blocking the flow of the pressure medium in the reverse direction. Specifically, the third valve 233 may allow the hydraulic pressure created in the first pressure chamber 112 to be transferred to the second hydraulic circuit 202 and block the hydraulic pressure of the second hydraulic circuit 202 from leaking out into the first pressure chamber 112 through the third hydraulic flow path 213.

The fourth hydraulic flow path 214 may be linked to the second pressure chamber 113 and coupled to the third hydraulic flow path 213. The fourth hydraulic flow path 214 may be branched into the fifth and sixth hydraulic flow paths 215 and 216, which may join together. Furthermore, the seventh hydraulic flow path 217 may have one end located between the first valve 231 and the second valve 232 in the second hydraulic flow path 223 and the other end coupled to the rear end of the third valve 233 in the third hydraulic flow path 213, thereby connecting the second hydraulic flow path 212 and the third hydraulic flow path 213.

In the fifth and sixth hydraulic flow paths 215 and 216, there may be fourth and fifth valves 234 and 235 arranged, respectively, to control the flow of the pressure medium.

The fourth valve 234 may be provided as a bidirectional valve to control the flow of the pressure medium transmitted along the fifth hydraulic flow path 215. The fourth valve 234 may be provided as a normal closed type of solenoid valve that is normally closed but opened when receiving an electric signal from the ECU.

The fifth valve 235 may be configured as a check valve that allows the flow of the pressure medium in a direction from the fourth hydraulic flow path 214 connected to the second pressure chamber 113 to a point that joins the third hydraulic flow path 213 while blocking the flow of the pressure medium in the reverse direction. That is, the fifth valve 235 may prevent the hydraulic pressure of a hydraulic flow path connected to the first or second hydraulic circuit 201 or 202 from leaking out into the second pressure chamber 113 through the sixth and fourth hydraulic flow paths 216 and 214.

The fourth and fifth valves 234 and 235 may form a parallel structure together as the fifth and sixth hydraulic flow paths 215 and 216 are branched from the forth hydraulic flow path 214 and join together.

With this structure of flow paths and valves, the hydraulic pressure created in the second pressure chamber 113 by backward motion of the hydraulic piston 214 may be applied to the second and third hydraulic flow paths 212 and 213 through the fourth, fifth, sixth, and seventh hydraulic flow paths 214, 215, 216, and 217, and thus transferred to the first and second hydraulic circuits 201 and 202.

Furthermore, since the seventh hydraulic flow path 217 has both ends linked and coupled to the rear ends of the first and second valves 231 and 232, respectively, the hydraulic pressure created in the first pressure chamber 112 may be stably transferred to the first and second hydraulic circuits 201 and 202 even when the first valve 231 or the second valve 232 has an error. Moreover, as the second and fourth valves 232 and 234 are operated to be opened, the hydraulic pressure created in the second pressure chamber 113 may be stably transferred to the first and second hydraulic circuits 201 and 202.

The first and second valves 231 and 232 may be operated to be opened when the pressure medium is taken out of the wheel cylinder 40 and supplied to the first pressure chamber 112 to release the hydraulic pressure applied in the wheel cylinder 40. In addition, the hydraulic pressure applied in the wheel cylinder 40 arranged in the second hydraulic circuit 202 may be applied to the first pressure chamber 112 along the seventh hydraulic flow path 217. This is because the third valve 233 arranged in the third hydraulic flow path 213 allows the flow of the pressure medium only in one direction.

The first and second hydraulic circuits 201 and 202 of the hydraulic controller 200 will now be described.

The first hydraulic circuit 201 may control the hydraulic pressure of the wheel cylinders 40 installed on the rear right and rear left wheels RR and RL, and the second hydraulic circuit 202 may control the hydraulic pressure of the wheel cylinders 40 installed on the front right and front left wheels FR and FL.

The first hydraulic circuit 201 may be coupled to the first and second hydraulic flow paths 211 and 212 to receive hydraulic pressure from the hydraulic pressure supplier 100, and the second hydraulic flow path 212 may be branched into two flow paths connected to the rear right wheel RR and the rear left wheel RL. Similarly, the second hydraulic circuit 202 may be coupled to the first and third hydraulic flow paths 211 and 213 to receive hydraulic pressure from the hydraulic pressure supplier 100, and the third hydraulic flow path 213 may be branched into two flow paths connected to the front right wheel FR and the front left wheel FL.

The first and second hydraulic circuits 201 and 202 may have a plurality of inlet valves 221 (221a, 221b, 221c, and 221d) to control the flow of the pressure medium and the hydraulic pressure. For example, the first hydraulic circuit 201 may have two inlet valves 221a and 221b coupled to the second hydraulic flow path 212 for controlling hydraulic pressure transferred to the two wheel cylinders 40, respectively, and the second hydraulic circuit 202 may have two inlet valves 221c and 221d coupled to the third hydraulic flow path 213 for controlling hydraulic pressure transferred to the two wheel cylinders 40, respectively.

These inlet valves 221 are provided as a normal open type of solenoid valves that are normally open but closed when receiving an electric signal from the ECU.

The first and second hydraulic circuits 201 and 202 may include check valves 223a, 223b, 223c, and 223d coupled in parallel with the inlet valves 221a, 221b, 221c, and 221d of the first and second hydraulic circuits 201 and 202, respectively. The check valves 223a, 223b, 223c, and 223d may each be arranged in a bypass flow path connecting the front and back of each of the inlet valves 221a, 221b, 221c, and 221d in the first and second hydraulic circuits 201 and 202, allowing the flow of the pressure medium from the wheel cylinder 40 to the hydraulic pressure supplying unit 110 while blocking the flow of the pressure medium from the hydraulic pressure supplying unit 110 to the wheel cylinder 40. The check valves 223a, 223b, 223c, and 223d may quickly take out the hydraulic pressure of the pressure medium applied in the wheel cylinder 40, and may enable the hydraulic pressure of the pressure medium applied in the wheel cylinder 40 to be moved to the hydraulic pressure supplying unit 110 even when the inlet valves 221a, 221b, 221c, and 221d are not working properly.

The first and second hydraulic circuits 201 and 202 may further include a plurality of outlet valves 222 (222a, 222b, 222c, and 222d) coupled to the reservoir 30 in order to enhance the brake-release performance when the braking of the wheel cylinder 40 is released. The outlet valve 222 is coupled to each wheel cylinder 40 to control the flow of the pressure medium that is taken out from the wheel cylinder 40 of each wheel RR, RL, FR, FL. The outlet valve 222 may control reduction of pressure of the wheel cylinder 40 by detecting the braking pressure of each wheel RR, RL, FR, FL and being selectively opened if it is necessary to reduce the braking pressure.

The outlet valve 222 may be provided as a normal closed type of solenoid valve that is normally closed but opened when receiving an electric signal from the ECU.

At least one of first and second outlet valves 222a and 222b coupled to the wheel cylinders 40 on the rear wheels RL and RR of the first hydraulic circuit 201 may be provided as an analog-type valve to be able to control an extent of opening of the valve. This will be described later in detail with reference to FIG. 5

In the rear wheel regenerative braking, the second valve 232 is controlled in the closed state, the hydraulic pressure applied in the wheel cylinders 40 on the rear wheels RL and RR of the first hydraulic circuit 201 remains constant. Afterwards, however, in a case of reducing the hydraulic pressure of the wheel cylinder 40 on the rear wheel RL, RR as needed, if the second valve 232 is opened, the hydraulic pressure of the wheel cylinder 40 on the rear wheel RL, RR starts to be reduced after the hydraulic pressure is matched, i.e., synchronized, to the same level as the hydraulic pressure of the first pressure chamber 112, so it is difficult to perform quick reduction of pressure in response to a braking situation.

However, with the first and second outlet valves 222a and 222b provided as analog-type valves capable of controlling the extent of opening of the valve to smoothly and linearly reduce the hydraulic pressure of the wheel cylinder 40 on the rear wheel RL, RR, the hydraulic pressure of the wheel cylinder 40 on the rear wheel RL, RR may be reduced to an adequate level for regenerative braking or a braking level desired by the driver, thereby effectively responding to various operation environments.

In the first and second dump flow paths 116 and 117, there may be first and second dump valves 241 and 242 arranged, respectively, to control the flow of the pressure medium. Turning back to FIG. 1, the first and second dump valves 241 and 242 may be provided as check valves configured to allow the flow of the pressure medium from the reservoir 30 to the first and second pressure chambers 112 and 113 while blocking the flow of the pressure medium in the reverse direction. Specifically, the first dump valve 241 may allow the pressure medium to flow from the reservoir 30 to the first pressure chamber 112 while blocking the pressure medium from flowing into the reservoir 30 from the first pressure chamber 112, and the second dump valve 242 may allow the pressure medium to flow from the reservoir 30 to the second pressure chamber 113 while blocking the pressure medium from flowing into the reservoir 30 from the second pressure chamber 112.

There may also be a bypass flow path coupled in parallel to the second dump valve 242. Specifically, the bypass flow path may be arranged to link the front and back of the second dump valve 242 with a detour in the second dump flow path 117, and there may be a third dump valve 243 arranged in the bypass flow path to control the flow of the pressure medium between the second pressure chamber 113 and the reservoir 30.

The third dump valve 243 may be provided as a bidirectional valve to control the flow of the pressure medium between the reservoir 30 and the second pressure chamber 113. The third dump valve 243 may be provided as a normal open type of solenoid valve that is normally open but closed when receiving an electric signal from the ECU.

The hydraulic pressure supplying unit 110 of the electronic braking system 1 in accordance with an embodiment of the present disclosure may operate in a double-acting mechanism.

Specifically, the hydraulic pressure created in the first pressure chamber 112 from the forward movement of the hydraulic piston 114 may be transferred to the first hydraulic circuit 201 through the first and second hydraulic flow paths 211 and 212 to perform braking of the wheel cylinders 40 installed on the rear right and rear left wheels RR and RL, and to the second hydraulic circuit 202 through the first and third hydraulic flow paths 211 and 213 to perform braking of the wheel cylinders 40 installed on the front right and front left wheels FR and FL.

Similarly, the hydraulic pressure created in the second pressure chamber 113 from the backward movement of the hydraulic piston 114 may be transferred to the first hydraulic circuit 201 through the fourth, fifth and sixth, seventh, and second hydraulic flow paths 214, 215 and 216, 217, and 212 to perform braking of the wheel cylinders 40 installed on the rear right and rear left wheels RR and RL, and to the second hydraulic circuit 202 through the fourth, fifth, and sixth, and third hydraulic paths 214, 215, 216 and 213 to perform braking of the wheel cylinders 40 installed on the front right and front left wheels FR and FL.

Furthermore, the negative pressure created in the first pressure chamber 112 from the backward movement of the hydraulic piston 114 may suck in the pressure medium of the wheel cylinder 40 installed on the rear right and rear left wheels RR and RL to be returned to the first pressure chamber 112 from the first hydraulic circuit 201 through the second and first hydraulic flow paths 212 and 211, and may suck in the pressure medium of the wheel cylinder 40 installed on the front right and front left wheels FR and FL to be returned to the first pressure chamber 112 from the second hydraulic circuit 202 through the third, seventh, second, and first hydraulic flow paths 213, 217, 212, and 211.

In addition, the electronic braking system 1 in accordance with an embodiment of the present disclosure may include the first and second backup flow paths 251 and 252 to perform braking by supplying the pressure medium discharged from the master cylinder 20 directly to the wheel cylinder 40 in case of abnormal operation due to e. G, the failure of a device.

The first backup flow path 251 may be arranged to link the first hydraulic port 24a of the master cylinder 20 and the second hydraulic circuit 202, and the second backup flow path 252 may be arranged to link the second hydraulic port 24b of the master cylinder 20 and the first hydraulic circuit 201. Specifically, the first backup flow path 251 may be coupled to join the front ends of the third and fourth inlet valves 221c and 221d in the second hydraulic circuit 202, and the second backup flow path 252 may be coupled to join the front ends of the first and second inlet valves 221a and 221b in the first hydraulic circuit 201.

A first cut valve 261 may be arranged in the first backup flow path 251 to control the flow of the pressure medium, and a second cut valve 262 may be arranged in the second backup flow path 252 to control the flow of the pressure medium. The first and second cut valves 261 and 262 may be provided as a normal open type of solenoid valves that are normally open but closed when receiving a close signal from the ECU.

With this, in a case of closing the first and second cut valves 261 and 262, the hydraulic pressure applied from the hydraulic pressure supplier 100 may be applied to the wheel cylinder 40 through the first and second hydraulic circuits 201 and 202, and in a case of opening the first and second cut valves 261 and 262, the hydraulic pressure applied from the master cylinder 20 may be applied to the wheel cylinder 40 through the first and second backup flow paths 251 and 252. At this time, since the plurality of inlet valves 221a, 221b, 221c, and 221d are in the open state, there is no need to switch the operation state.

In an embodiment of the present disclosure, the electronic braking system 1 may include a backup flow path pressure sensor PS1 to detect hydraulic pressure of the master cylinder 20, and flow path pressure sensors PS21 and PS22 to detect hydraulic pressure of at least one of the first and second hydraulic circuits 201 and 202. The backup flow path pressure sensor PS1 may be arranged, for example, at the front end of the first cut valve 262 in the first backup flow path 251 to detect hydraulic pressure created from the master cylinder 20, and the flow path pressure sensors PS21 and PS22 may be arranged at the front ends of the inlet valves 221 of at least one of the first and second hydraulic circuits 201 and 202 to detect hydraulic pressure applied to the first or second hydraulic circuits 201 and 202, respectively. Although it is shown that the flow path pressure sensors PS21 and PS22 are arranged for the first and second hydraulic circuits 201 and 202, respectively, it is not limited thereto and there may be one or multiple number of flow path pressure sensors capable of detecting hydraulic pressure applied to the hydraulic circuit 201, 202.

As the market requirements for echo-friendly vehicles grow, hybrid vehicles with improved fuel efficiency are becoming popular. The hybrid vehicle employs a method of retrieving and storing kinetic energy as electric energy while the brake is applied and using the motor as an auxiliary driving source of the vehicle. The hybrid vehicle typically retrieves the energy through a generator to increase the energy retrieval rate while the brake is applied. This braking operation is called regenerative braking. However, since regenerative braking pressure from the generator is added in addition to the hydraulic braking pressure applied to the four wheels of the vehicle during the regenerative braking, close cooperative control is required between the hydraulic braking pressure from the hydraulic pressure supplier and the regenerative braking pressure in order to apply uniform braking force to the four wheels for safe braking.

Figure 2:
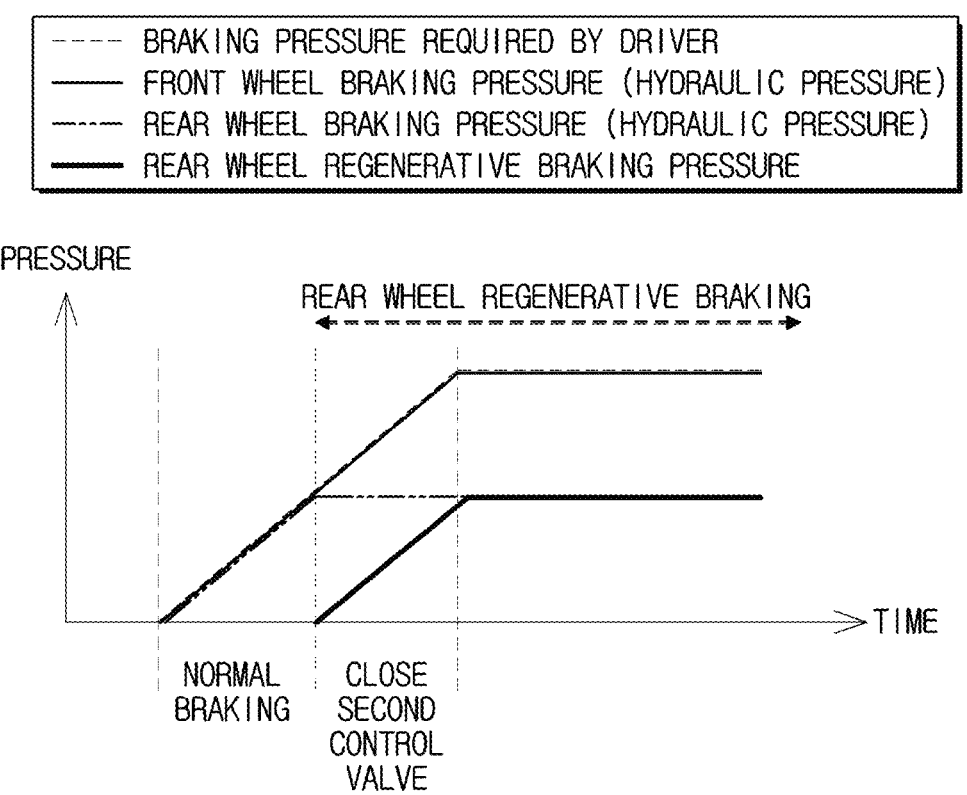
FIG. 2 shows plots schematically representing characteristics of hydraulic pressure of a wheel cylinder and regenerative braking pressure in regenerative braking in an electronic braking system, according to an embodiment of the present disclosure.

FIG. 2 shows plots schematically representing characteristics of hydraulic pressure of a wheel cylinder and regenerative braking pressure in regenerative braking in an electronic braking system, according to an embodiment of the present disclosure.

Referring to FIG. 2, in the case that an energy retrieving device such as a generator is installed on the rear wheel RL and RR of the first hydraulic circuit 201 as shown in FIG. 1, hydraulic braking pressure matching the braking level desired by the driver is created by the hydraulic pressure supplier and the overall braking force of the front wheels to which the hydraulic braking pressure is only applied is increased and maintained to be the same as the hydraulic braking pressure desired by the driver. However, for the rear wheel that realizes regenerative braking, the overall braking force of the rear wheel, which is the combination of the hydraulic braking pressure from the hydraulic pressure supplier and the regenerative braking pressure from the generator needs to be the same as the overall braking force of the front wheel or hydraulic braking pressure desired by the driver. Accordingly, as soon as the vehicle starts regenerative braking, the second valve 232 of the hydraulic controller 200 is closed, which makes the hydraulic braking pressure applied to the rear wheels from the hydraulic pressure supplier remain constant, and at the same time, the regenerative braking pressure from the energy retrieval device such as the generator increases to the same level as the overall braking force of the front wheels or the hydraulic braking pressure desired by the driver. This will be described in more detail with reference to FIG. 4.

Operation method of the electronic braking system 1 in accordance with an embodiment of the present disclosure will now be described.

In a normal operation mode, the electronic braking system 1 may use the hydraulic pressure supplier 100 separately in a low pressure mode and a high pressure mode. The low pressure mode and the high pressure mode may be changed by varying the operation of the hydraulic controller 200. The hydraulic pressure supplier 100 may apply high hydraulic pressure without need to increase the output of the motor 120 in the high pressure mode, thereby reducing the load applied to the motor 120. With this, the braking system may guarantee stable braking force while reducing the cost and weight of the braking system, and may enhance durability and operation reliability of the device.

As the motor 120 operates to move the hydraulic piston 114 forward, hydraulic pressure is created in the first pressure chamber 112. As the hydraulic piston 114 moves forward from its original position, i.e., as the operation stroke of the hydraulic piston 114 increases, the supply rate of the pressure medium transmitted from the first pressure chamber 112 to the wheel cylinder 40 increases and the hydraulic braking pressure increases as well. However, there is an effective stroke with the hydraulic piston 114, so there is the maximum pressure from the forward movement of the hydraulic piston 114.

The maximum pressure in the low pressure mode is less than the maximum pressure in the high pressure mode. However, the high pressure mode has a smaller rate of increase in pressure per stroke of the hydraulic piston 114 than in the low pressure mode. This is because the pressure medium discharged from the first pressure chamber 112 is not all transmitted to the wheel cylinder 40 but some of the pressure medium is transmitted to the second pressure chamber 113. This will be described in more detail with reference to FIG. 6.

Accordingly, in the early stage of braking, during which the brake response is considered important, the low pressure mode having a greater rate of increase in pressure per stroke may be used, and in the latter period of braking, during which the maximum braking force is considered important, the high pressure mode having a larger maximum pressure may be used.

Figure 3:
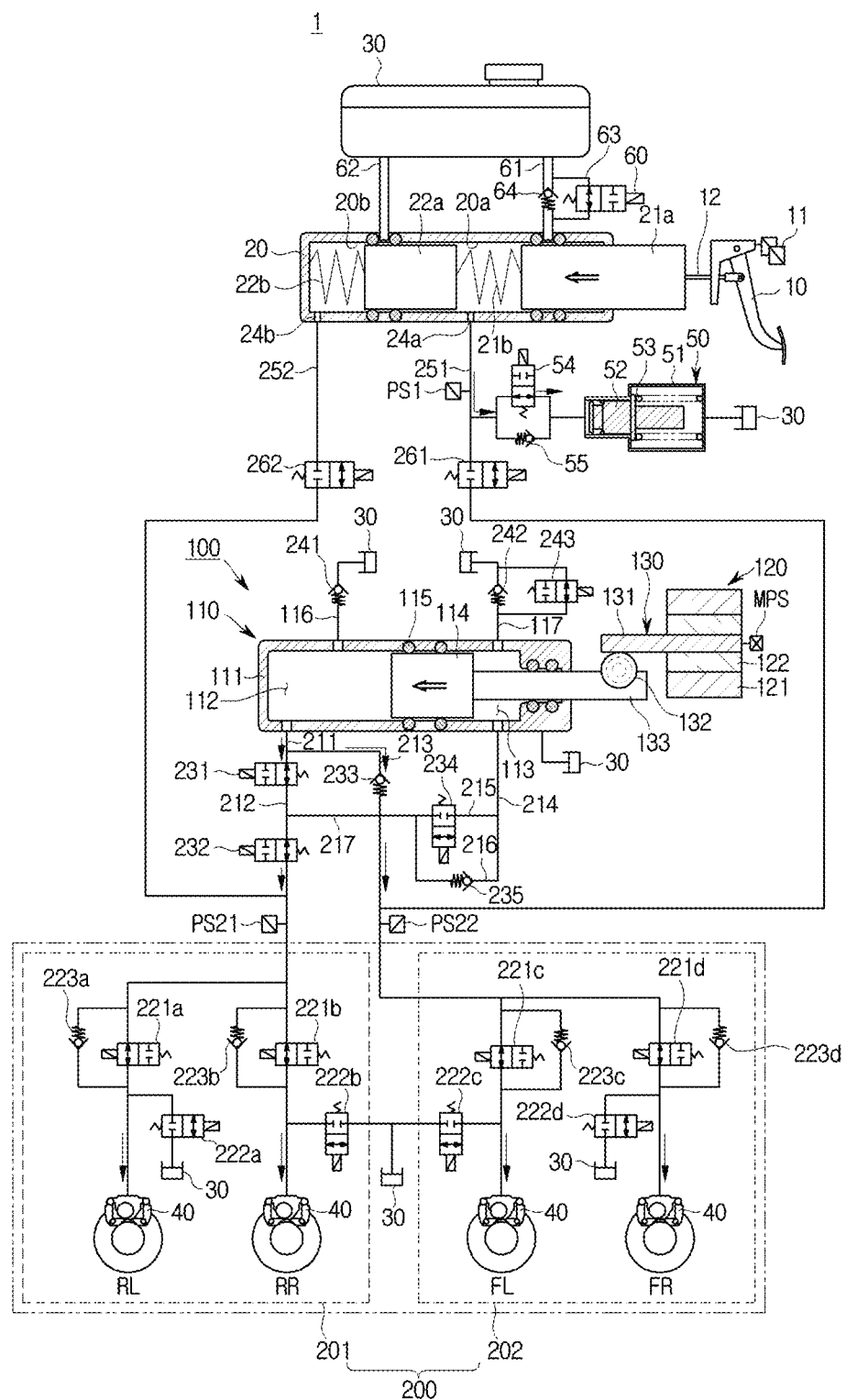
FIG. 3 is a hydraulic circuit diagram illustrating a state of applying braking pressure of a low pressure mode while a hydraulic piston moves forward in an electronic braking system, according to an embodiment of the present disclosure.
Figure 4:
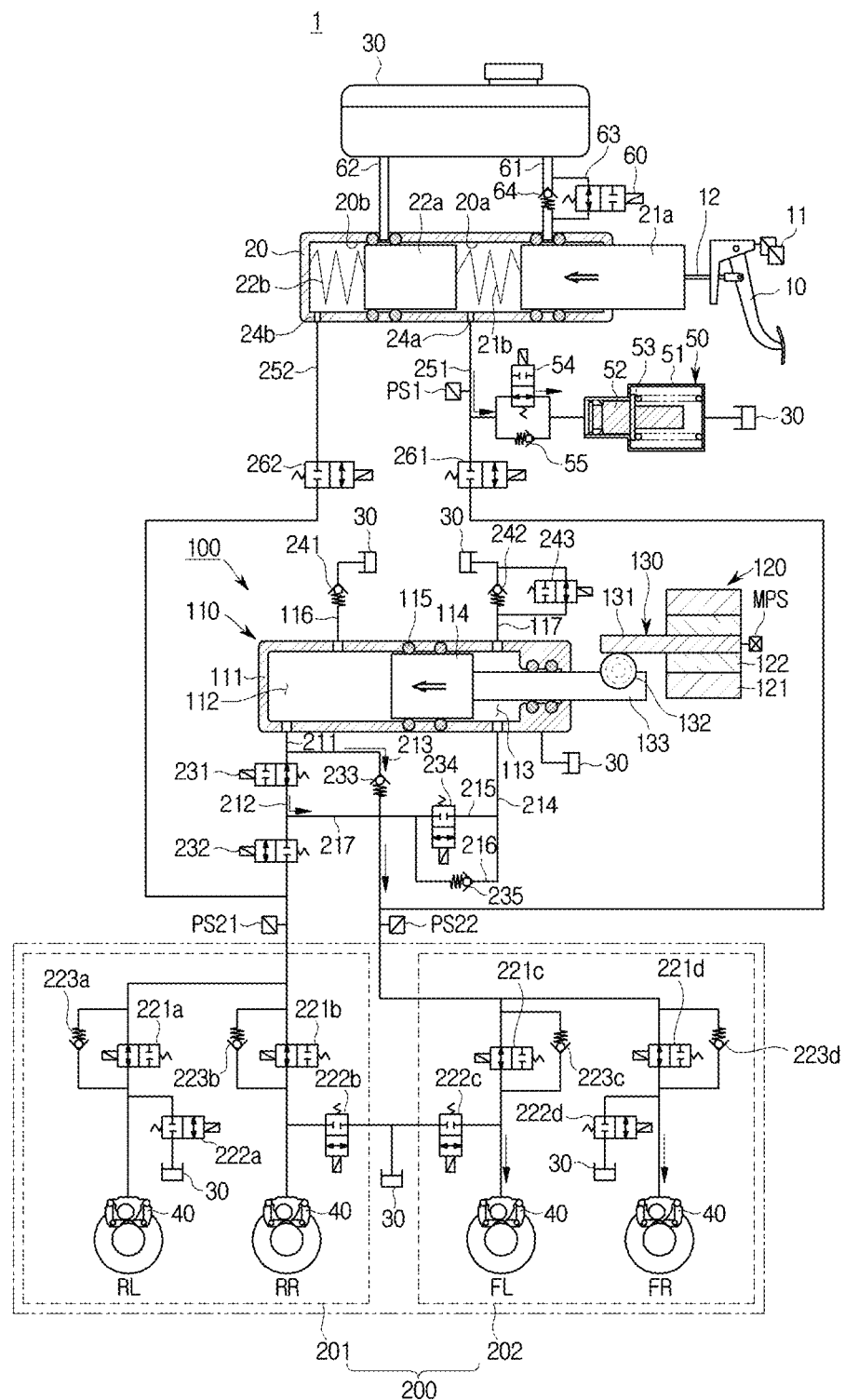
FIG. 4 is a hydraulic circuit diagram illustrating a state of applying braking pressure and performing rear wheel regenerative braking while a hydraulic piston moves forward in an electronic braking system, according to an embodiment of the present disclosure.
Figure 5:
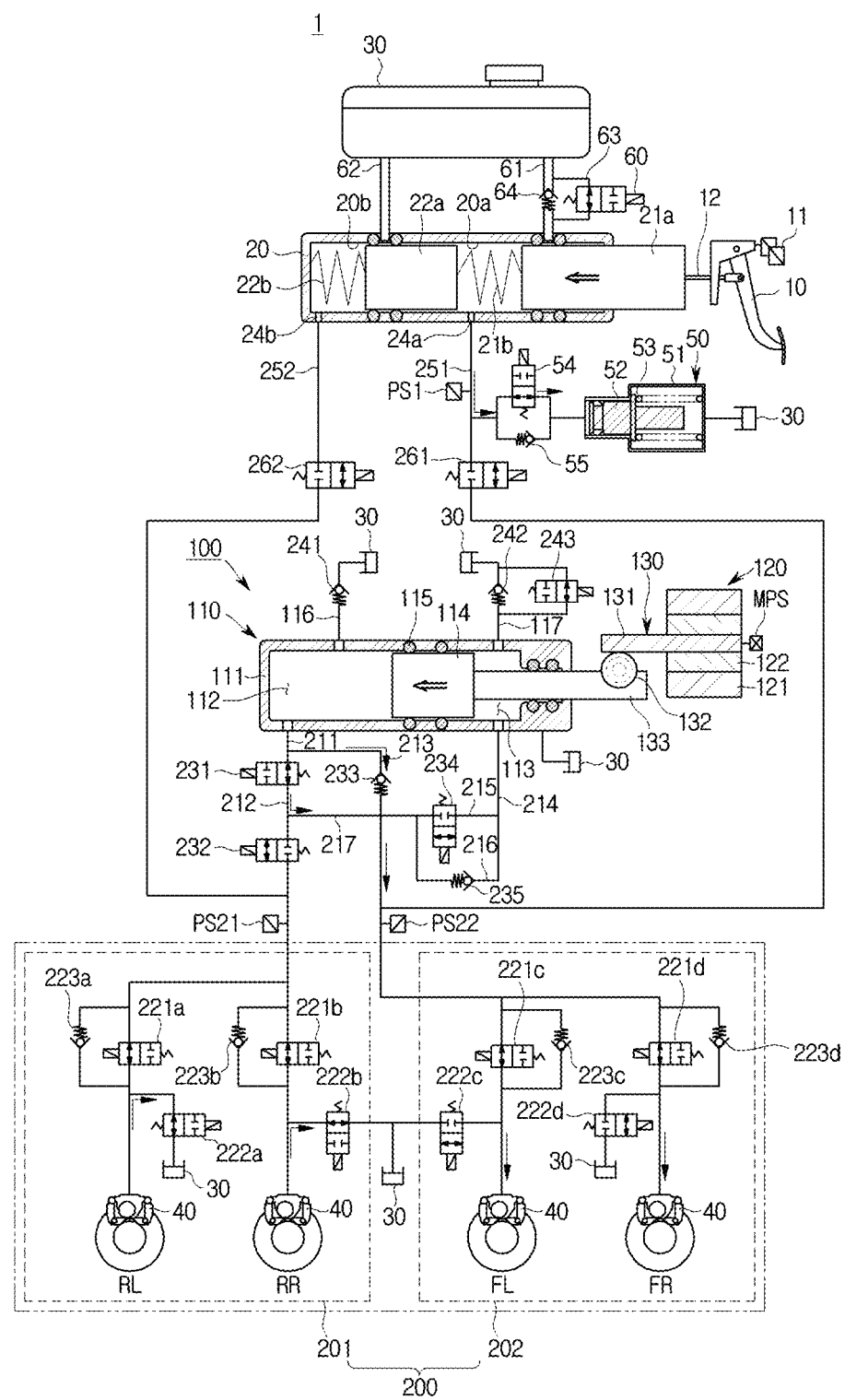
FIG. 5 is a hydraulic circuit diagram illustrating a state of reducing braking pressure only on the rear wheels in rear wheel regenerative braking in an electronic braking system, according to an embodiment of the present disclosure.
Figure 6:
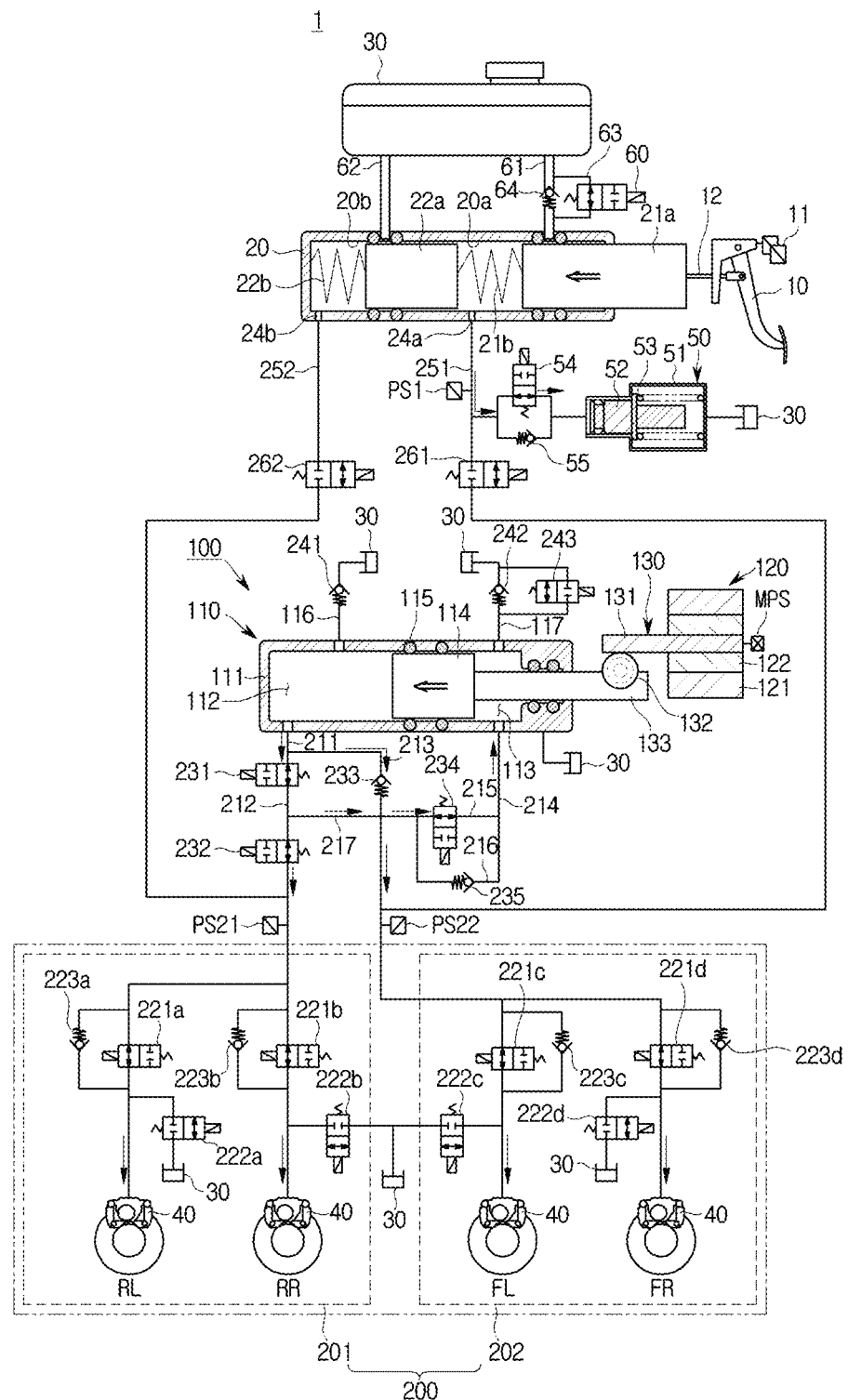
FIG. 6 is a hydraulic circuit diagram illustrating a state of applying braking pressure of a high pressure mode while a hydraulic piston moves forward in an electronic braking system, according to an embodiment of the present disclosure.

FIG. 3 is a hydraulic circuit diagram illustrating a state of applying hydraulic pressure of a low pressure mode while the hydraulic piston 114 moves forward in the electronic braking system 1, according to an embodiment of the present disclosure, and FIG. 4 is a hydraulic circuit diagram illustrating a state of implementing rear wheel regenerative braking while in the state of applying the braking pressure of FIG. 3. FIG. 5 is a hydraulic circuit diagram illustrating a state of reducing the braking pressure only for rear wheels during the rear wheel regenerative braking of FIG. 4, and FIG. 6 is a hydraulic circuit diagram illustrating a state of applying hydraulic pressure of high pressure mode while a hydraulic piston moves forward in an electronic braking system, according to an embodiment of the present disclosure.

Referring to FIG. 3, when the driver puts on the brake pedal 10 in the early stage of braking, the motor 120 is rotated in one direction and the rotational force of the motor 120 is transferred to the hydraulic pressure supplying unit 110 by the power converter 130, making the hydraulic piston 114 of the hydraulic pressure supplying unit 110 move forward to create hydraulic pressure in the first pressure chamber 112. The hydraulic pressure discharged from the first pressure chamber 112 is transferred to the wheel cylinder 40 arranged on each of the four wheels through the first and second hydraulic circuits 201 and 202, generating braking force.

Specifically, the hydraulic pressure applied from the first pressure chamber 112 is transferred directly to the wheel cylinder 40 arranged in the first hydraulic circuit 201 through the first and second hydraulic flow paths 211 and 212 linked to the first link hole. At this time, the first and second inlet valves 221a and 221b installed in the two flow paths branched from the first hydraulic circuit 201 are open, and the first and second outlet valves 222a and 222b installed in the flow paths branched from the two flow paths branched from the first hydraulic circuit 201 remain closed to prevent the hydraulic pressure from leaking out into the reservoir 30.

Furthermore, the hydraulic pressure applied from the first pressure chamber 112 is transferred directly to the wheel cylinder 40 arranged in the second hydraulic circuit 202 through the first and third hydraulic flow paths 211 and 213 linked to the first link hole. At this time, the third and fourth inlet valves 221c and 221d installed in the two flow paths branched from the second hydraulic circuit 202 are open, and the third and fourth outlet valves 222c and 222d installed in the flow paths branched from the two flow paths branched from the second hydraulic circuit 202 remain closed to prevent the hydraulic pressure from leaking out into the reservoir 30.

In this case, the first and second valves 231 and 232 are switched into the open state to open the second hydraulic flow path 212. Furthermore, the hydraulic pressure applied from the pressure chamber 112 may sequentially pass the first, second, and seventh hydraulic flow paths 211, 212, and 217 and may be transferred to the second hydraulic circuit 202 through the third hydraulic flow path 213, or may sequentially pass the first, third, and seventh hydraulic flow paths 211, 213, and 217 and may be transferred to the first hydraulic circuit 202 through the second hydraulic flow path 212.

The fourth valve 234 may remain closed to cut off the fifth hydraulic flow path 215. This may prevent the hydraulic pressure created in the first pressure chamber 112 from being transferred to the second pressure chamber 113 through the fifth hydraulic flow path 215, thereby increasing the rate of increase in pressure per stroke of the hydraulic piston 114. Accordingly, it may facilitate quick braking response in the early stage of braking.

The first and second cut valves 261 and 262 arranged in the first and second backup flow paths 251 and 252 may be closed when the hydraulic pressure of the pressure medium is created by the hydraulic pressure supplier 100 to prevent the hydraulic pressure discharged from the master cylinder 20 from being transferred to the wheel cylinder 40. The hydraulic pressure created in the master cylinder 20 by a pedal force on the brake pedal 10 is transferred to the simulation device 50 coupled with the master cylinder 20. At this time, a simulator valve 54 arranged at the front end of the simulation chamber 51 is opened, and the hydraulic pressure discharged from the first master chamber 20a of the master cylinder 20 is transferred to the front of the reaction piston 52 in the simulation chamber 51 through the simulator valve 54. This may cause the reaction piston 52 to move to compress the reaction spring 53, and the reaction force corresponding to the pedal force is applied by the elastic recovery force of the reaction spring 53 to give an adequate pedal feeling to the driver.

The flow path pressure sensor PS21, PS22 for detecting hydraulic pressure of at least one of the first and second hydraulic circuits 201 and 202 detects the hydraulic pressure transferred to the wheel cylinder 40, and based on the detection, the flow rate or the hydraulic pressure of the pressure medium transmitted to the wheel cylinder 40 may be controlled by controlling operation of the hydraulic pressure supplier 100. Furthermore, in regenerative braking of the rear wheel cylinder 40 of the first hydraulic circuit 201, the ECU may determine whether and when to close the second valve 232 based on the pressure information detected by the flow path pressure sensor P21. Moreover, if the hydraulic pressure transferred to the wheel cylinder 40 is higher than a target pressure value in response to the pedal force on the brake pedal 10, the hydraulic pressure may be controlled to match the target pressure value by opening at least one of the first to fourth outlet valves 222.

Operation of the rear wheel regenerative braking of the electronic braking system 1 in accordance with an embodiment of the present disclosure will now be described.

Referring to FIG. 4, as described above, when the driver puts on the brake pedal 10 in the early stage of braking, during which the pressure under the low pressure mode is applied, the motor 120 is rotated in one direction and the rotational force of the motor 120 is transferred to the hydraulic pressure supplying unit 110 by the power converter 130, making the hydraulic piston 114 of the hydraulic pressure supplying unit 110 move forward to create hydraulic pressure in the first pressure chamber 112. The hydraulic pressure discharged from the first pressure chamber 112 is transferred to the wheel cylinder 40 arranged on each of the four wheels through the first and second hydraulic circuits 201 and 202, generating braking force.

Furthermore, the first and second valves 231 and 232 are switched into the open state to open the second hydraulic flow path 212. The hydraulic pressure applied from the first pressure chamber 112 may then sequentially pass the first and second hydraulic flow paths 211 and 212 and may be transferred to the first hydraulic circuit 201 in which the wheel cylinders 40 for the rear wheels RL, RR are installed, or may sequentially pass the first and third hydraulic flow paths 211 and 213 and may be transferred to the second hydraulic circuit 202 in which the wheel cylinders 40 for the front wheels FL,FR are installed.

Afterwards, in a case that the ECU determines that regenerative braking is driven at the rear wheels of the vehicle, specifically, at the wheel cylinders 40 of the first hydraulic circuit 201, the ECU obtains the magnitude of the hydraulic braking pressure calculated based on a difference between the braking pressure required by the driver and the regenerative braking pressure, and cuts off transfer of the hydraulic pressure by closing the second valve 232 after the first hydraulic circuit 201 applies as much hydraulic pressure as the pressure level of interest to the rear wheel cylinders 40. Accordingly, the hydraulic braking pressure of the rear wheels at which the regenerative braking occurs is more reduced than in the case of non-regenerative braking.

The ECU may use the flow path pressure sensor PS21 for detecting the hydraulic pressure of the first hydraulic circuit 201 to stably control the hydraulic braking pressure transferred to the rear wheel cylinder 40 of the first hydraulic circuit 201 from the hydraulic pressure supplier 100. Specifically, the ECU may more precisely control the hydraulic braking pressure of the rear wheels that needs to be cut off or reduced at the rear wheel cylinders 40 of the first hydraulic circuit 201 in generative braking, by detecting the hydraulic braking pressure transferred to the front wheel cylinder 40 of the second hydraulic circuit 202, to which only the hydraulic braking pressure is transferred from the hydraulic pressure supplier 100, through the flow path pressure sensor PS22 and comparing the detected hydraulic braking pressure with hydraulic braking pressure transferred to the rear wheel cylinder 40 of the first hydraulic circuit 201.

As such, as the ECU controls operation of the second valve 232 in the rear wheel regenerative braking, the hydraulic braking pressure applied to the rear wheel cylinder 40 of the first hydraulic circuit 201 may be stably controlled in synchronization with the regenerative braking pressure, making it possible to uniformly distribute the braking pressure or braking force applied to the four wheels of the vehicle and preventing oversteering or understeering, thereby securing stability in braking of the vehicle and enhancing driving stability of the vehicle.

In the rear wheel regenerative braking, the second valve 232 is controlled in the closed state, the hydraulic pressure applied on the wheel cylinders 40 on the rear wheels RL and RR of the first hydraulic circuit 201 remains constant. Afterwards, however, in a case of reducing the hydraulic pressure of the wheel cylinder 40 on the rear wheel RL, RR as needed, if the second valve 232 is opened, the hydraulic pressure of the wheel cylinder 40 on the rear wheel RL, RR starts to be reduced after the hydraulic pressure is matched, i.e., synchronized, to the same level as the hydraulic pressure of the first pressure chamber 112, so it is difficult to perform quick reduction of pressure in response to a braking situation.

The first and second outlet valves 222a and 222b may be provided as analog type valves capable of controlling the extent of opening of the valves to smoothly and linearly reduce the hydraulic pressure of the wheel cylinders 40 on the rear wheels RL and RR. Referring to FIG. 4, in the rear wheel regenerative braking of the first hydraulic circuit 201, the first and second outlet valves 222a and 222b may be operated in an analog manner to reduce only the hydraulic braking pressure of the rear wheel cylinder 40. Accordingly, the hydraulic pressure of the wheel cylinders 40 on the rear wheels RL and RR during the regenerative braking may be reduced in synchronization with an adequate level for regenerative braking or a braking level desired by the driver, thereby effectively responding to various operation environments.

The hydraulic pressure supplier 100 of the electronic braking system 1 in accordance with an embodiment of the present disclosure may be switched from the low pressure mode as shown in FIGS. 3 to 5 to the high pressure mode as shown in FIG. 6 before the hydraulic piston 114 moves forward to the greatest extent.

Referring to FIG. 6, if the hydraulic pressure detected by the flow path pressure sensor PS21, PS22 is higher than a preset pressure level, the ECU may switch the hydraulic pressure supplier 100 to the high pressure mode from the low pressure mode. In the high pressure mode, the fourth valve 234 may be switched into the open state to open the fifth hydraulic flow path 215. Accordingly, some of the hydraulic pressure created in the first pressure chamber 112 may sequentially pass the first, third, fifth, and fourth hydraulic flow paths 211, 213, 215, and 214 and may be transferred to the second pressure chamber 113, forcing the hydraulic piston 114 to move forward as well as reduce the load applied to the motor 120.

In the high pressure mode, some of the pressure medium discharged from the first pressure chamber 112 is moved into the second pressure chamber 113, so the rate of increase in pressure per stroke decreases. However, some of the hydraulic pressure created in the first pressure chamber 112 is used to move the hydraulic piston 114 further forward, increasing the maximum pressure of the pressure medium. This is because the rate of change in volume per stroke of the hydraulic piston 114 is relatively smaller in the second pressure chamber 113 than in the first pressure chamber 112 as the driving shaft 133 passes through the second pressure chamber 113.

Furthermore, as the hydraulic piston 114 moves forward, the hydraulic pressure of the first pressure chamber 112 increases, which increases the force to move the hydraulic piston 114 backward, and accordingly, the load applied to the motor 120 increases as well. However, since some of the pressure medium discharged from the first pressure chamber 112 is transmitted to the second pressure chamber 113 by opening the fifth hydraulic flow path 215 under the control of the fourth valve 234, hydraulic pressure is created even in the second pressure chamber 113, thereby reducing the load applied to the motor 120.

At this time, the third dump valve 243 may be switched into the closed state. As the third dump valve 243 is closed, the pressure medium in the first pressure chamber 112 may be quickly moved into the second pressure chamber under the negative pressure, and the hydraulic pressure may be applied to the second pressure chamber 113 as well. However, if needed, the third dump valve 243 may remain opened to control the pressure medium in the second pressure chamber 113 to be moved into the reservoir 30.

An operation state in which braking pressure is applied to the wheel cylinder 40 as the hydraulic piston 114 moves backward will now be described.

Figure 7:
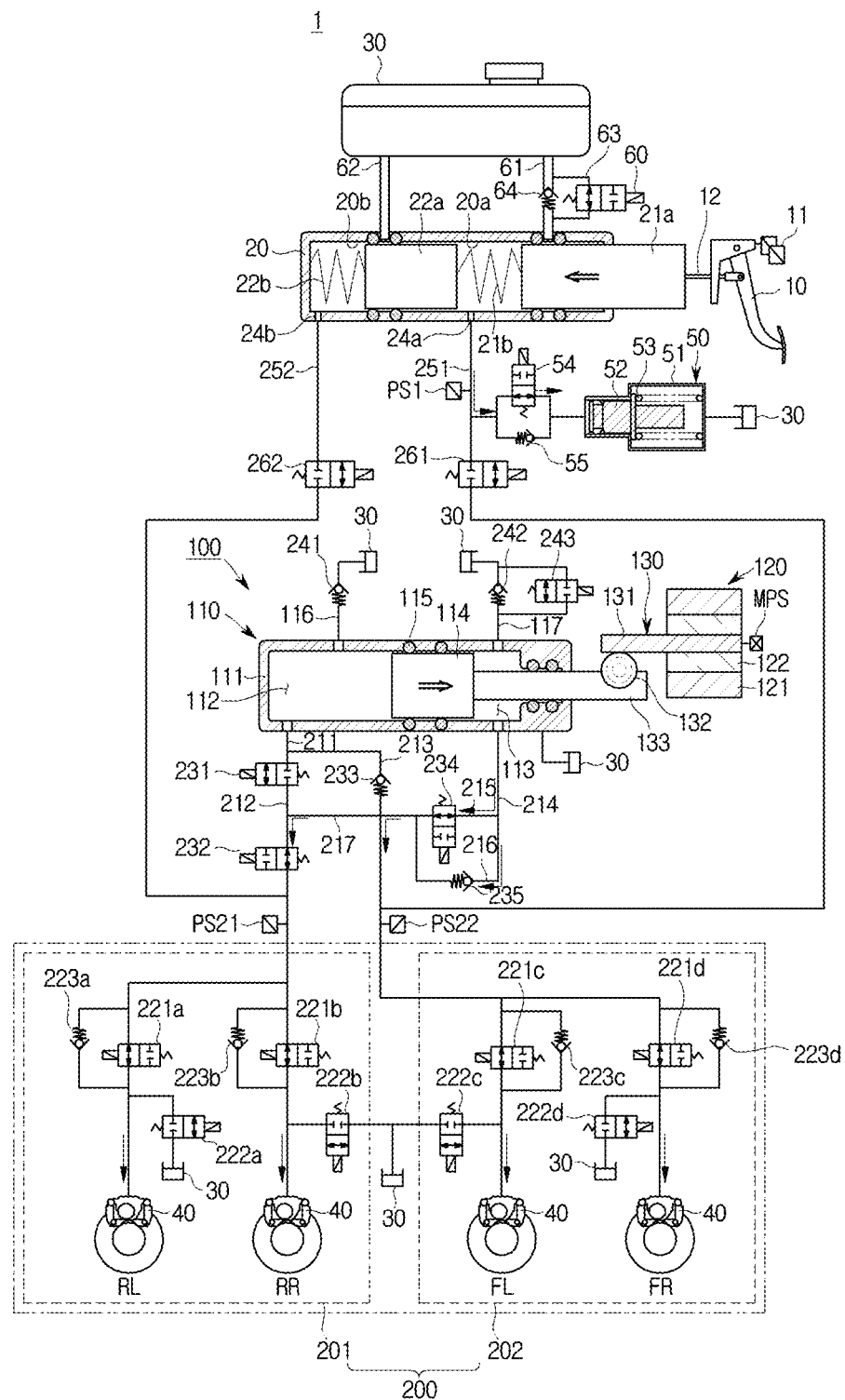
FIG. 7 is a hydraulic circuit diagram illustrating a state of applying braking pressure while a hydraulic piston moves backward in an electronic braking system, according to an embodiment of the present disclosure.

FIG. 7 is a hydraulic circuit diagram illustrating a state of applying braking pressure while the hydraulic piston 114 moves backward in the electronic braking system 1, according to an embodiment of the present disclosure. Referring to FIG. 7, when the driver puts on the brake pedal 10 in the early stage of braking, the motor 120 is rotated in the reverse direction and the rotational force of the motor 120 is transferred to the hydraulic pressure supplying unit 110 by the power converter 130, making the hydraulic piston 114 of the hydraulic pressure supplying unit 110 move backward to create hydraulic pressure in the second pressure chamber 113. The hydraulic pressure discharged from the second pressure chamber 113 is transferred to the wheel cylinder 40 arranged on each of the four wheels through the first and second hydraulic circuits 201 and 202, generating braking force.

Specifically, the hydraulic pressure applied from the second pressure chamber 113 sequentially passes the fourth hydraulic flow path 214 coupled to the second link hole, the open fifth or sixth hydraulic flow path 215 or 216, and the seventh hydraulic flow path 217 and is transferred directly to the rear wheel cylinder 40 arranged in the first hydraulic circuit 201 through the second hydraulic flow path 212. At this time, the first and second inlet valves 221a and 221b are open, and the first and second outlet valves 222a and 222b remain closed to prevent the hydraulic pressure from leaking out into the reservoir 30.

Furthermore, the hydraulic pressure applied from the second pressure chamber 113 sequentially passes the fourth hydraulic flow path 214 coupled to the second link hole, and the open fifth or sixth hydraulic flow path 215 or 216, and is transferred directly to the front wheel cylinder 40 arranged in the second hydraulic circuit 202 through the third hydraulic flow path 213. At this time, the third and fourth inlet valves 221c and 221d are open, and the third and fourth outlet valves 222c and 222d remain closed to prevent the hydraulic pressure from leaking out into the reservoir 30.

The fourth valve 234 is switched into the open state to open the fifth hydraulic flow path 215, and the fifth valve 235 is provided as a check valve allowing the flow of the pressure medium in a direction from the second pressure chamber 113 to the wheel cylinder 40, making the sixth hydraulic flow path 216 opened as well. Furthermore, the second valve 232 is also switched into the open state to transfer the hydraulic pressure even to the wheel cylinder 40 of the first hydraulic circuit 201.

Meanwhile, the first valve 231 may remain closed. This may prevent the hydraulic pressure created in the second pressure chamber 113 from leaking out into the first pressure chamber 112 through the second hydraulic flow path 212, thereby increasing the rate of increase in pressure per stroke of the hydraulic piston 114 and facilitating quick brake responses in the early stage of braking.

The third dump valve 243 may also be switched into the closed state. As the third dump valve 243 is closed, the hydraulic pressure of the pressure medium may be quickly and stably created in the second pressure chamber 113 and discharged only to the fourth hydraulic flow path 214.

Operation of releasing braking pressure in the normal operation state of the electronic braking system 1 in accordance with an embodiment of the present disclosure will now be described.

Figure 8:
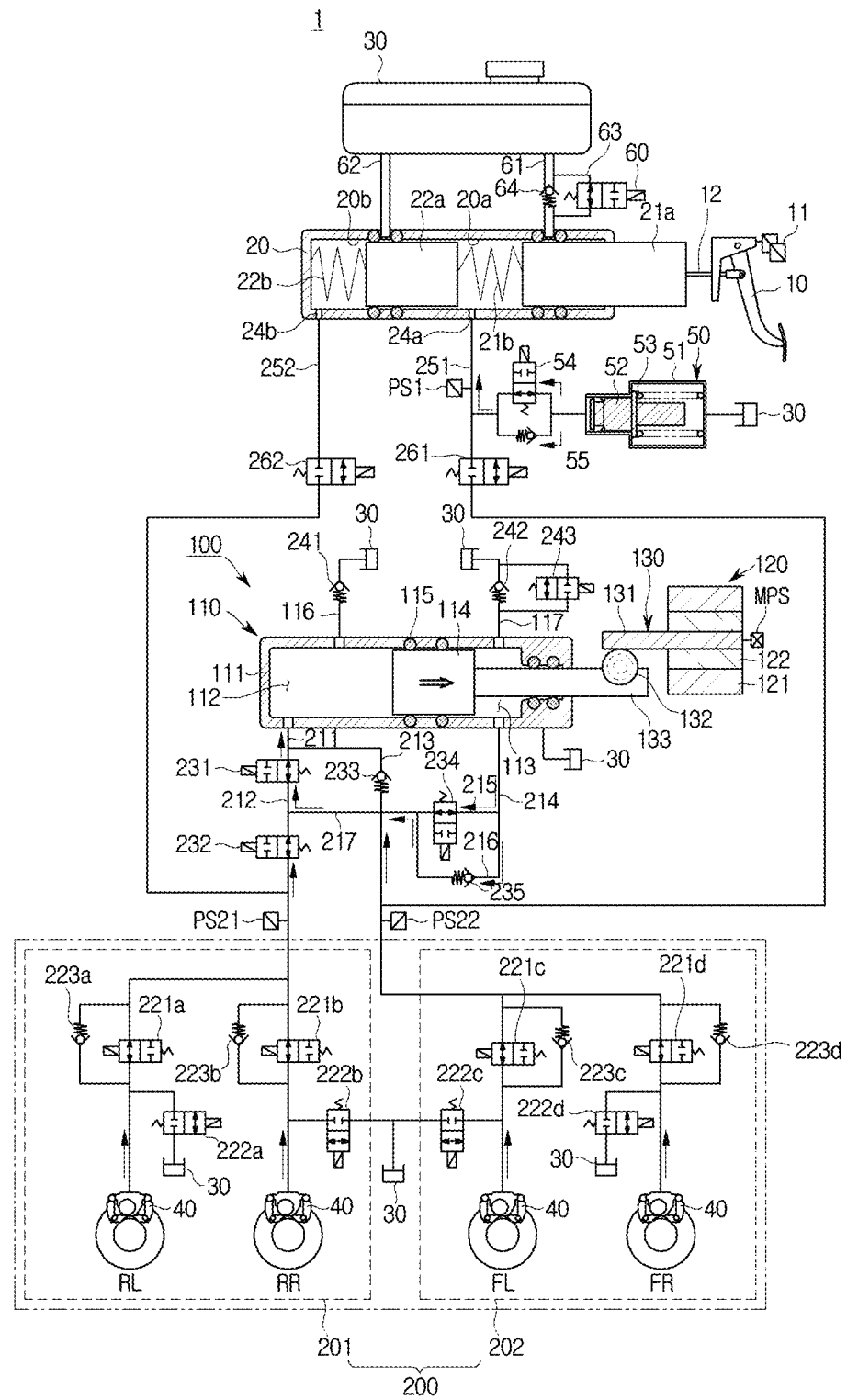
FIG. 8 is a hydraulic circuit diagram illustrating a state of releasing braking pressure of a high pressure mode while a hydraulic piston moves backward in an electronic braking system, according to an embodiment of the present disclosure.
Figure 9:
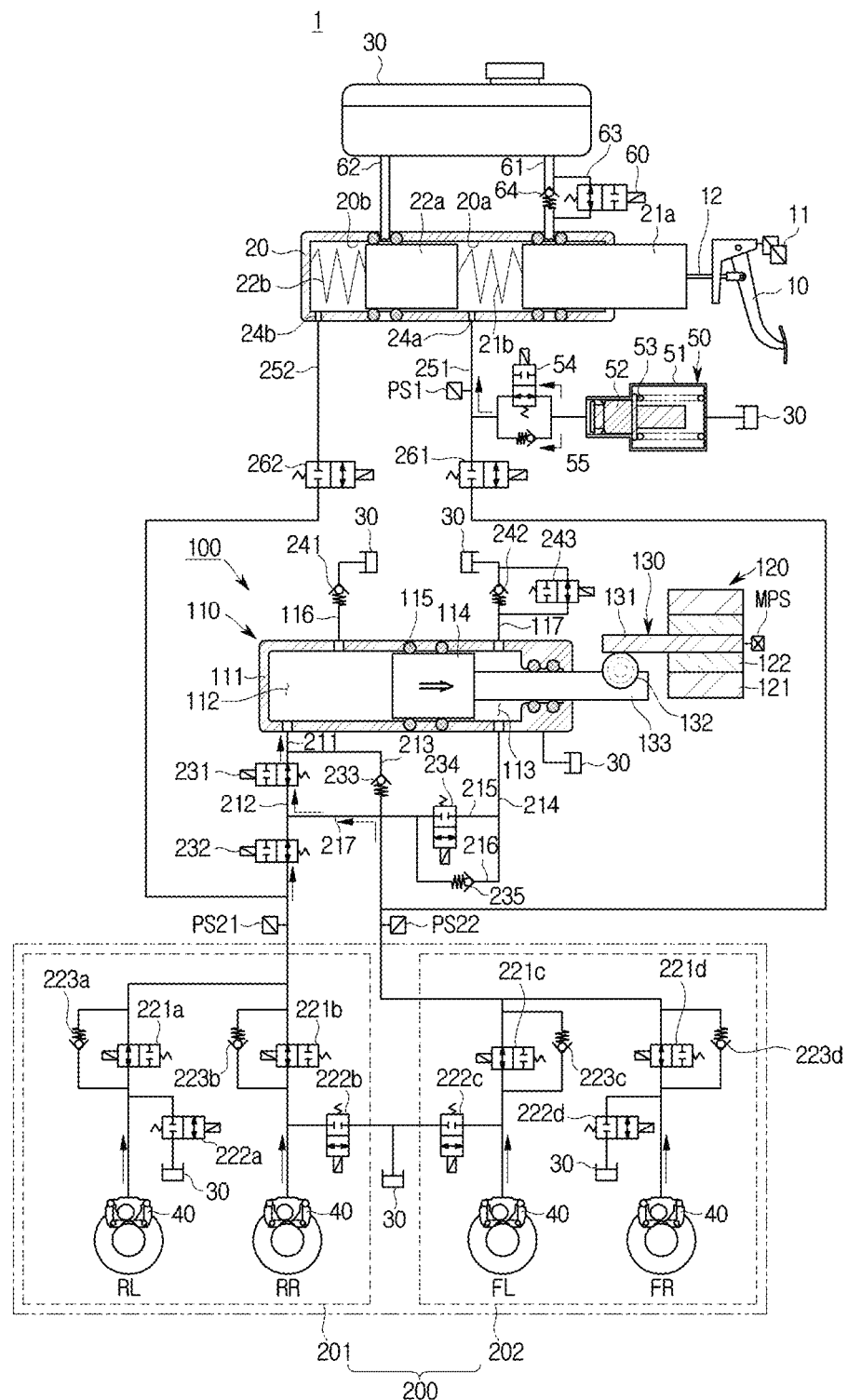
FIG. 9 is a hydraulic circuit diagram illustrating a state of releasing braking pressure of a low pressure mode while a hydraulic piston moves backward in an electronic braking system, according to an embodiment of the present disclosure.

FIG. 8 is a hydraulic circuit diagram illustrating a state of releasing braking pressure of a high pressure mode while the hydraulic piston 114 moves backward in the electronic braking system 1, according to an embodiment of the present disclosure, and FIG. 9 is a hydraulic circuit diagram illustrating a state of releasing braking pressure of a low pressure mode while the hydraulic piston 114 moves backward in the electronic braking system 1, according to an embodiment of the present disclosure.

Referring to FIG. 8, when a pedal force applied to the brake pedal 10 is released, the motor 120 generates rotational force in a reverse direction to the direction during the braking and transfers the rotational force to the power converter 130. The worm shaft 131, the worm wheel 132, and the driving shaft 133 of the power converter 130 are rotated in a reverse direction to the direction during the braking to move the hydraulic piston 114 backward to its original position. Accordingly, the hydraulic pressure is released but the negative pressure is created in the first pressure chamber 112. Simultaneously, the pressure medium discharged from the wheel cylinder 40 is transmitted to the first pressure chamber 112 through the first and second hydraulic circuits 201 and 202.

Specifically, the negative pressure created in the first pressure chamber 112 releases the pressure of the rear wheel cylinder 40 arranged in the first hydraulic circuit 201 through the second and first hydraulic flow paths 212 and 211. At this time, the first and second inlet valves 221a and 221b installed in the two flow paths branched from the first hydraulic circuit 201 remain opened, and the first and second outlet valves 222a and 222b installed in the flow paths branched from the two flow paths branched from the first hydraulic circuit 201 remain closed to prevent the pressure medium of the reservoir 30 from moving into the first pressure chamber 112.

Furthermore, the negative pressure created in the first pressure chamber 112 releases the pressure of the front wheel cylinder 40 arranged in the second hydraulic circuit 202 through the third, seventh, second, and first hydraulic flow paths 213, 217, 212, and 211. At this time, the third and fourth inlet valves 221c and 221d installed in the two flow paths branched from the second hydraulic circuit 202 remain opened, and the third and fourth outlet valves 222c and 222d installed in the flow paths branched from the two flow paths branched from the second hydraulic circuit 202 remain closed to prevent the pressure medium of the reservoir 30 from moving into the first pressure chamber 112.

The first and second valves 231 and 232 are switched into the open state and the fourth valve 234 is also switched into the open state to open the fifth hydraulic flow path 215. Accordingly, the first and second pressure chambers 112 and 113 are linked together.

To create the negative pressure in the first pressure chamber 112, the hydraulic piston 114 needs to move backward, but if there is the hydraulic pressure of the pressure medium in the second pressure chamber 113, there is reluctance to move the hydraulic piston 114 backward. In this case, the first and fourth valves 231 and 234 are switched into the open state to link the first and second pressure chambers 112 and 113, allowing the pressure medium in the second pressure chamber 113 to be supplied to the first pressure chamber 112.

At this time, the third dump valve 243 may be switched into the closed state. As the third dump valve 243 is closed, the pressure medium in the second pressure chamber 113 may be discharged only to the fourth hydraulic flow path 214. However, if needed, the third dump valve 243 may remain opened to control the pressure medium in the second pressure chamber 113 to be moved into the reservoir 30.

Moreover, if the negative pressure transferred to the first and second hydraulic circuits 201 and 202 is measured to be higher than a target pressure release value in response to an amount of release of the brake pedal 10, the negative pressure may be controlled to match the target pressure value by opening at least one of the first to fourth outlet valves 222. The first and second cut valves 261 and 262 installed in the first and second backup flow paths 251 and 252 may be closed to prevent the negative pressure created in the master cylinder 20 from being transferred to the hydraulic controller 200.

In the meantime, in an operation state of the high pressure mode as shown in FIG. 8, since the negative pressure in the first pressure chamber 112 created when the hydraulic piston 114 moves backward forces not only the pressure medium in the wheel cylinder 40 but also the pressure medium in the second pressure chamber 113 to be supplied to the first pressure chamber 112, the rate of decrease in pressure of the wheel cylinder 40 is small. Accordingly, in the high pressure mode, it is difficult to quickly release the braking pressure. Hence, the operation of releasing the braking pressure in the high pressure mode may be used only in a high pressure condition of the braking pressure, and in the case that the braking pressure is not greater than a certain level, the operation of releasing the braking pressure may be switched into the low pressure mode as shown in FIG. 9 in order to quickly release the braking pressure.

Referring to FIG. 9, in the case of releasing the braking pressure in the low pressure mode, the fourth valve 234 remains closed or is switched into the closed state to maintain or switch the third dump valve 243 to be in the open state instead of closing the fifth hydraulic flow path 215, thereby linking the second pressure chamber 113 and the reservoir 30.

In the case of releasing the braking pressure in the low pressure mode, the negative pressure created in the first pressure chamber 112 is only used to retrieve the pressure medium of the wheel cylinder 40, thereby increasing the rate of decrease in pressure per stroke of the hydraulic piston 114 as compared with the case of releasing the braking pressure in the high pressure mode. At this time, the hydraulic pressure created in the second pressure chamber 113 from backward movement of the hydraulic piston 114 is mostly transferred to the reservoir 30 under the air pressure rather than passing the fifth valve 235 as the third dump valve 243 is switched into the open state.

Unlike FIG. 9, even when the hydraulic piston 114 moves forward, the braking pressure of the wheel cylinder 40 may be released.

Figure 10:
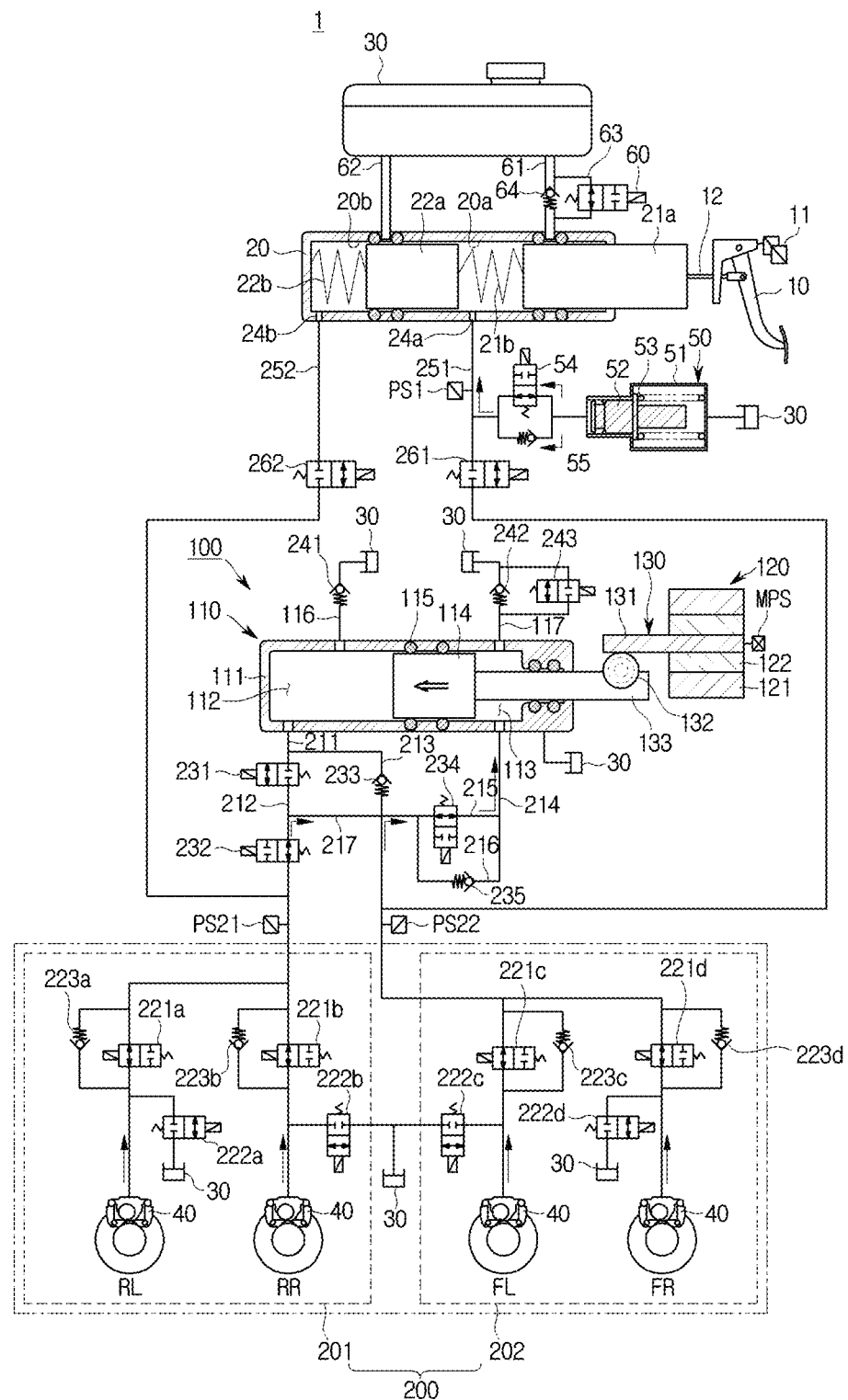
FIG. 10 is a hydraulic circuit diagram illustrating a state of releasing braking pressure while a hydraulic piston moves forward in an electronic braking system, according to an embodiment of the present disclosure.

FIG. 10 is a hydraulic circuit diagram illustrating a state of releasing braking pressure while the hydraulic piston 114 moves forward in the electronic braking system 1, according to an embodiment of the present disclosure.

Referring to FIG. 10, when a pedal force applied to the brake pedal 10 is released, the motor 120 generates rotational force in a reverse direction to the direction during the braking and transfers the rotational force to the power converter 130. The worm shaft 131, the worm wheel 132, and the driving shaft 133 of the power converter 130 are rotated in a reverse direction to the direction during the braking to move the hydraulic piston 114 forward to its original position, releasing the hydraulic pressure of the second pressure chamber 113 and creating negative pressure. Simultaneously, the pressure medium discharged from the wheel cylinder 40 is transmitted to the second pressure chamber 113 through the first and second hydraulic circuits 201 and 202.

Specifically, the negative pressure created in the second pressure chamber 113 sequentially passes the second, seventh, and fifth hydraulic flow paths 202, 217, and 215 and releases the pressure of the rear wheel cylinder 40 arranged in the first hydraulic circuit 201 through the fourth hydraulic flow path 214. At this time, the first and second inlet valves 221a and 221b installed in the two flow paths branched from the first hydraulic circuit 201 remain opened, and the first and second outlet valves 222a and 222b installed in the flow paths branched from the two flow paths branched from the first hydraulic circuit 201 remain closed to prevent the pressure medium of the reservoir 30 from moving into the second pressure chamber 113.

Furthermore, the negative pressure created in the second pressure chamber 113 sequentially passes the third and fifth hydraulic flow paths 213 and 215, and releases the pressure of the front wheel cylinder 40 arranged in the second hydraulic circuit 202 through the fourth hydraulic flow path 214. At this time, the third and fourth inlet valves 221c and 221d installed in the two flow paths branched from the second hydraulic circuit 202 remain opened, and the third and fourth outlet valves 222c and 222d installed in the flow paths branched from the two flow paths branched from the second hydraulic circuit 202 remain closed to prevent the pressure medium of the reservoir 30 from moving into the second pressure chamber 113.

In this case, the fourth valve 234 is switched into the open state to open the fifth hydraulic flow path 215.

Furthermore, the third dump valve 243 may be switched into the closed state, and thus the negative pressure created in the second pressure chamber 113 may quickly retrieve the pressure medium from the wheel cylinder 40.

Moreover, if the negative pressure transferred to the first and second hydraulic circuits 201 and 202 is measured to be higher than a target pressure release value in response to an amount of release of the brake pedal 10, the negative pressure may be controlled to match the target pressure value by opening at least one of the first to fourth outlet valves 222. The first and second cut valves 261 and 262 installed in the first and second backup flow paths 251 and 252 may be closed to prevent the negative pressure created in the master cylinder 20 from being transferred to the hydraulic controller 200.

An operation state in which the electronic braking system 1 in accordance with an embodiment of the present disclosure is not normally working will now be described.

Figure 11:
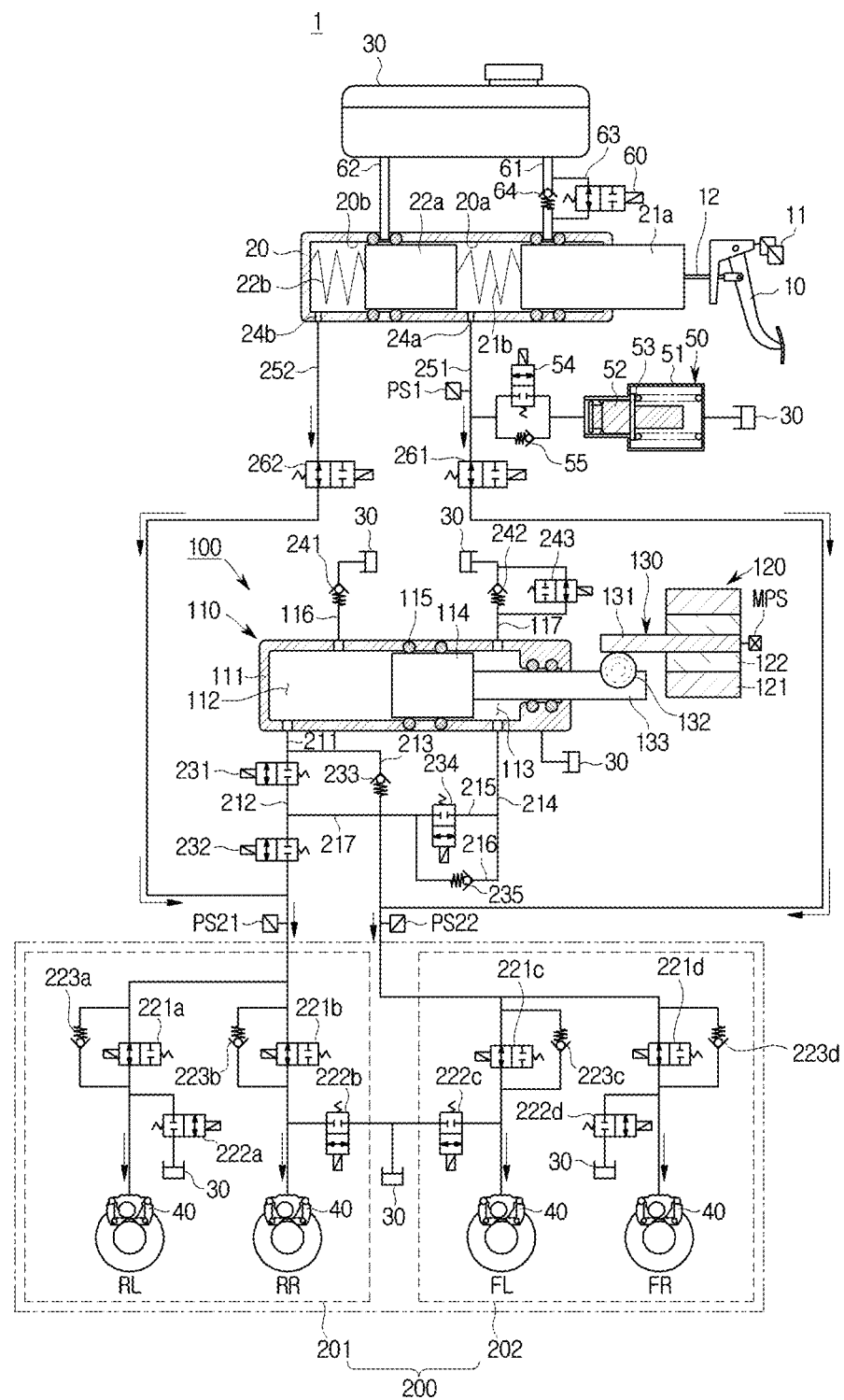
FIG. 11 is a hydraulic circuit diagram illustrating an abnormal operation state of an electronic braking system, according to an embodiment of the present disclosure.

FIG. 11 is a hydraulic circuit diagram illustrating an abnormal operation state (fallback mode) of an electronic braking system, according to an embodiment of the present disclosure.

Referring to FIG. 11, in the case that the electronic braking system 1 is not normally working, the respective valves are controlled in the initial braking state in which the valves are not operated. Afterwards, when the driver puts on the brake pedal 10, the first piston 21a coupled to the brake pedal 10 moves forward, making the second piston 22a move forward as well. Accordingly, hydraulic pressure is created from the pressure medium contained in the first master chamber 20a and the second master chamber 20b, and the hydraulic pressure created in the first and second master chambers 20a and 20b is transferred to the wheel cylinder 40 through the first and second backup flow paths 251 and 252, realizing braking force.

At this time, since the first and second cut valves 261 and 262 arranged in the first and second backup flow paths 251 and 252 and the inlet valves 221 arranged in the first and second hydraulic circuits 201 and 202 are provided as a normal open type of solenoid valves, and the simulator valve 54 and the outlet valves 222 are provided as a normal closed type of solenoid valves, the hydraulic pressure created in the first and second master chambers 20a and 20b of the master cylinder 20 may be transferred directly to the four wheel cylinders 40, thereby facilitating quick braking as well as enhanced braking stability.

Operation of the electronic braking system 1 in a check mode in accordance with an embodiment of the present disclosure will now be described.

The check mode includes a mode to check whether there is a leakage in the master cylinder 20, a mode to check whether there is a leakage in the simulation device 50, and a mode to check the presence of air in the master cylinder 20. The braking system 1 may activate the check mode before the driver starts the vehicle, during stopping, or during driving and periodically or frequently check whether devices in the vehicle have errors.

Figure 12:
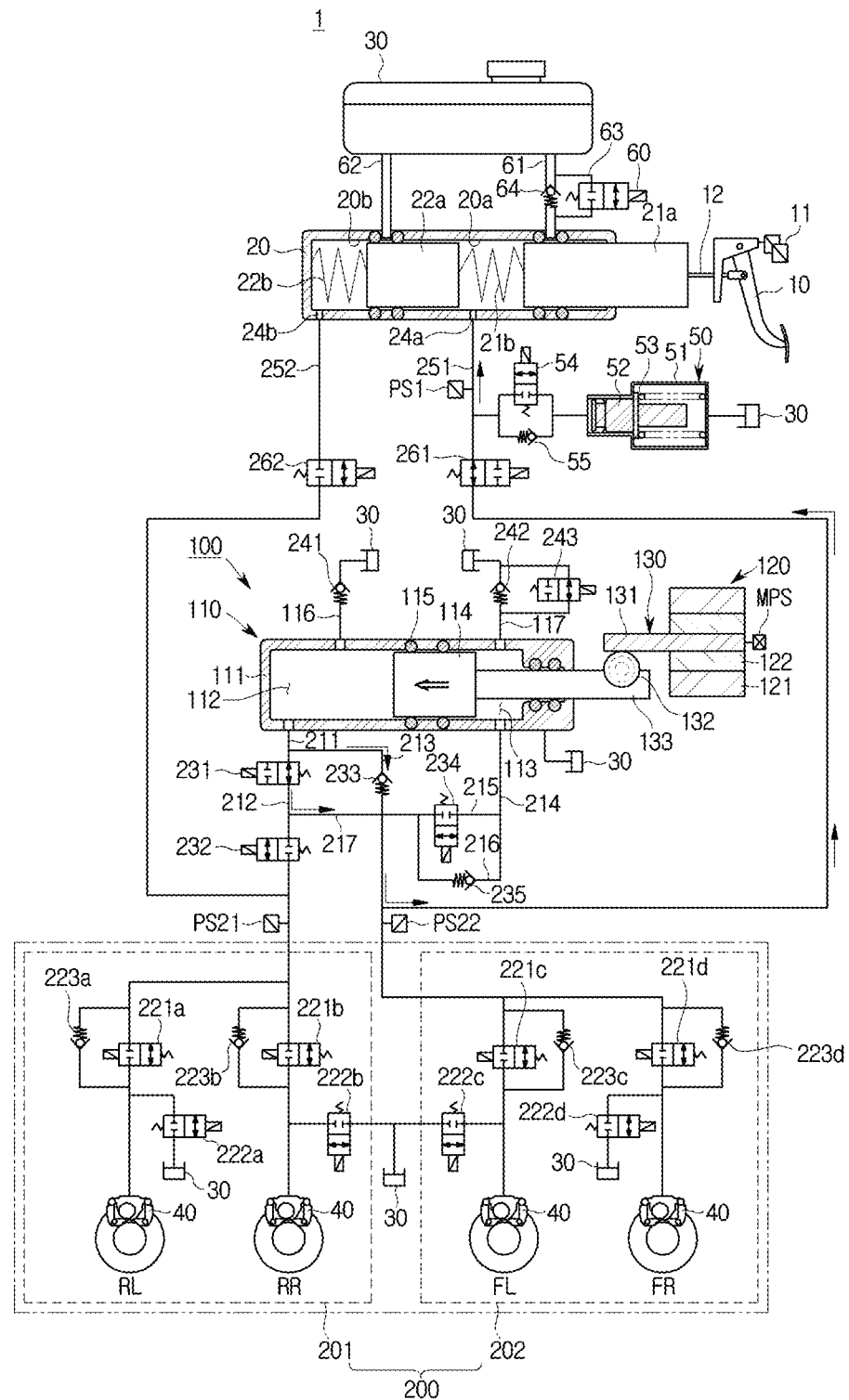
FIG. 12 is a hydraulic circuit diagram illustrating a state of checking whether a master cylinder or a simulation device leaks in an electronic braking system, according to an embodiment of the present disclosure.

FIG. 12 is a hydraulic circuit diagram illustrating a state in which the electronic braking system 1 checks whether the master cylinder 20 or the simulator valve 54 leaks or whether there is air in the master cylinder 20, according to an embodiment of the present disclosure.

As described above, when the electronic braking system 1 is abnormally working, the respective valves are controlled in the initial braking state in which the valves are not operated, and the first and second cut valves 261 and 262 installed in the first and second backup flow paths 251 and 252 and the inlet valves 221 arranged at the front ends of the wheel cylinders 40 arranged on the wheels RR, RL, FR, RL are opened for the hydraulic pressure to be transferred directly to the wheel cylinders 40.

At this time, the simulator valve 54 is closed to prevent the hydraulic pressure transferred to the wheel cylinder 40 through the first backup flow path 251 from leaking out into the reservoir 30 through the simulation device 50. Accordingly, the hydraulic pressure discharged from the master cylinder 20 when the driver puts on the brake pedal 10 is transferred to the wheel cylinder 40 without a loss, thereby securing stable braking.

On the other hand, if there is a leakage in the master cylinder 20 or the simulator valve 54, some of the hydraulic pressure discharged from the master cylinder 20 is likely to be leaked out into the reservoir 30 through the simulator valve 54, and consequently, braking force desired by the driver may not be generated, so there may be a problem with the stability in braking the vehicle.

Furthermore, even in a case that there is air in the master cylinder 20, the same problem may arise. In the case that there is air in the master cylinder 20, the pedal feeling sensed by the driver might be light, and if the driver recognizes it as a normal operation state and the operation is switched into the fallback mode, the braking performance may become poor.

If a loss in pressure occurs when the hydraulic pressure discharged from the hydraulic supplier 100 is transferred to the reservoir 30, it is difficult to know whether there is a leakage in the master cylinder 20 or the simulator valve 54 or whether there is air in the master cylinder 20. Accordingly, in the check mode, the hydraulic circuit coupled to the hydraulic pressure supplier 100 may be set as a closed-loop circuit by closing the check valve 60. Specifically, the closed-loop circuit may be formed by closing the check valve 60, the simulator valve 54, and the outlet valve 22 to cut off the flow path connecting the hydraulic pressure supplier 100 and the reservoir 30.

The braking system 1 may apply the hydraulic pressure only to the first backup flow path 251 coupled to the simulation device 50 among the first and second backup flow paths 251 and 252. Accordingly, the second cut valve 262 may be switched into the closed state to prevent the hydraulic pressure discharged from the hydraulic pressure supplier 100 from being transferred to the master cylinder 20 along the second backup flow path 252. Furthermore, the fourth valve 234 connecting the first and second hydraulic circuits 201 and 202 is controlled in the closed state to prevent the hydraulic pressure of the first pressure chamber 112 from leaking out into the second pressure chamber 113.

Referring to FIG. 12, in the check mode, the respective valves of the electronic braking system 1 are controlled in the initial braking state in which the valves are not operated, the first to fourth inlet valves 221a, 221b, 221c, and 221d and the second cut valve 262 are switched into the closed state, and the first cut valve 261 remains opened to transfer the hydraulic pressure created by the hydraulic pressure supplier 100 to the master cylinder 20.

The inlet valve 221 is controlled in the closed state to prevent the hydraulic pressure of the hydraulic pressure supplier 100 from being transferred to the wheel cylinder 40, the second cut valve 262 is controlled in the closed state to prevent the hydraulic pressure of the hydraulic pressure supplier 100 from being discharged along the second backup flow path 252, and the check valve 60 is switched into the closed state to prevent the hydraulic pressure applied to the master cylinder 20 from leaking out into the reservoir 30.

Especially, in the case of checking whether there is air in the master cylinder 20, the inlet valve 221 is controlled in the closed state to prevent the hydraulic pressure from being transferred to the wheel cylinder 40. This is because since a change in hydraulic pressure caused when there is air in the first master chamber 20a of the master cylinder 20 is very small, it is desirable to minimize interference of the hydraulic pressure with the wheel cylinder 40.

In the check mode, the ECU may create the hydraulic pressure through the hydraulic pressure supplier 100, and analyze the pressure value of the master cylinder 20 measured by the backup flow path pressure sensor PS1 to determine whether there is a leakage in the master cylinder 20 or in the simulator valve 54 or whether there is air in the master cylinder 20. By comparison between an expected value of hydraulic pressure of the pressure medium from the displacement of the hydraulic piston 114 and internal pressure of the first master chamber 20a measured by the backup flow path pressure sensor PS1, the presence of a leakage or air in the master cylinder 20 may be determined and the presence of a leakage in the simulator valve 54 may also be determined. Specifically, a value of hydraulic pressure of the first pressure chamber 112 calculated or expected based on an amount of displacement of the hydraulic piston 114 or a rotation angle measured by the motor position sensor MPS is compared with an actual value of the hydraulic pressure of the master cylinder 20, and if the two values of hydraulic pressure correspond to each other, it may be determined that there is no leakage in the master cylinder 20 and the simulator valve 54 and there is no air in the master cylinder 20. On the other hand, if the actual value of the hydraulic pressure of the master cylinder 20 is less than the value of hydraulic pressure of the first pressure chamber 112 calculated or expected based on the amount of displacement of the hydraulic piston 114 or the rotation angle measured by the motor position sensor MPS, it may be interpreted that some of the hydraulic pressure of the pressure medium applied to the first master chamber 20a is lost, so it is determined that there is a leakage in the master cylinder 20 or the simulator valve 54 or there is air in the master cylinder 20, which may be notified to the driver.

According to embodiments of the present disclosure, an electronic braking system and operation method thereof has a benefit of stably distributing braking pressure to each wheel in regenerative braking.

According to embodiments of the present disclosure, an electronic braking system and operation method thereof has a benefit of reducing braking pressure on the wheel even in regenerative braking and thus being able to operate various methods.

According to embodiments of the present disclosure, an electronic braking system and operation method thereof has a benefit of enhanced stability in driving of the vehicle.

According to embodiments of the present disclosure, an electronic braking system and operation method thereof has a benefit of stably generating high braking pressure.

According to embodiments of the present disclosure, an electronic braking system and operation method thereof has a benefit of enhanced product performance and operation reliability.

According to embodiments of the present disclosure, an electronic braking system and operation method thereof has a benefit of stably applying braking pressure even when a part has an error or a pressure medium leaks.

According to embodiments of the present disclosure, an electronic braking system and operation method thereof has a benefit of a simple structure that reduces the number of parts, and product size and weight.

According to embodiments of the present disclosure, an electronic braking system and operation method thereof has a benefit of enhanced product durability by reducing the load applied on parts of the braking system.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. An electronic braking system comprising:
a hydraulic pressure supplier configured to create hydraulic pressure by moving a hydraulic piston movably contained in a cylinder block based on an electric signal output to correspond to displacement of a brake pedal and have a first pressure chamber formed on one side of the hydraulic piston and a second pressure chamber formed on the other side of the hydraulic piston; and
a hydraulic controller configured to have a first hydraulic circuit controlling hydraulic pressure transferred to two wheel cylinders and a second hydraulic circuit controlling hydraulic pressure transferred to other two wheel cylinders,
wherein the hydraulic controller comprises
a first hydraulic flow path linked to the first pressure chamber, second and third hydraulic flow paths branched from the first hydraulic flow path and coupled to the first and second hydraulic circuits, respectively, a fourth hydraulic flow path linked to the second pressure chamber and coupled to the third hydraulic flow path, fifth and sixth hydraulic flow paths branched from a point of the fourth hydraulic flow path and connected to each other at another point, and a seventh hydraulic flow path connecting the second and third hydraulic flow paths.

2. The electronic braking system of claim 1, wherein the hydraulic controller comprises
a first valve arranged in the second hydraulic flow path and between a point coupled to the seventh hydraulic flow path and the first pressure chamber to control the flow of a pressure medium, a second valve arranged in the second hydraulic flow path and between a point coupled to the seventh hydraulic flow path and the first hydraulic circuit to control the flow of a pressure medium, a third valve arranged in the third hydraulic flow path to control the flow of a pressure medium, a fourth valve arranged in the fifth hydraulic flow path to control the flow of a pressure medium, and a fifth valve arranged in the sixth hydraulic flow path to control the flow of a pressure medium.

3. The electronic braking system of claim 2, wherein:
the first, second, and fourth valves are provided as solenoid valves to control bidirectional flows of a pressure medium,
the third valve is provided as a check valve to allow a flow of a pressure medium in a direction from the first pressure chamber to the second hydraulic circuit, and
the fifth valve is provided as a check valve to allow a flow of a pressure medium in a direction from the second pressure chamber to a point coupled to the third hydraulic flow path.

4. An operation method of an electronic braking system according to claim 3, the operation method comprising:
a normal operation mode sequentially operated with a low pressure mode to apply relatively low hydraulic pressure and a high pressure mode to apply relatively high hydraulic pressure, based on a hydraulic pressure level transferred to the wheel cylinder from the hydraulic pressure supplier.

5. The operation method of claim 4, wherein the low pressure mode is configured to
open the first and second valves, and
apply hydraulic pressure created in the first pressure chamber from a forward movement of the hydraulic piston to the first and second hydraulic circuits.

6. The operation method of claim 5, further comprising:
releasing the low pressure mode by
opening the first and second valves, and
creating negative pressure in the first pressure chamber from a backward movement of the hydraulic piston and retrieving a pressure medium of the first and second hydraulic circuits into the first pressure chamber.

7. The operation method of claim 5, wherein the high pressure mode is configured to
open the first and second valves,
apply some of hydraulic pressure created in the first pressure chamber from a forward movement of the hydraulic piston after the low pressure mode to the first and second hydraulic circuits,
open the fourth valve, and
apply the rest of the hydraulic pressure created in the first pressure chamber to the second pressure chamber.

8. The operation method of claim 7, further comprising:
releasing the high pressure mode by
opening the first and second valves,
creating negative pressure in the first pressure chamber from a backward movement of the hydraulic piston and retrieving a pressure medium of the first and second hydraulic circuits into the first pressure chamber,
opening the fourth valve, and
supplying a pressure medium of the second pressure chamber to the first pressure chamber.

9. The electronic braking system of claim 3, further comprising:
a generator provided for two wheel cylinders of the first hydraulic circuit.

10. The electronic braking system of claim 9, wherein:
the first hydraulic circuit comprises first and second inlet valves configured to control hydraulic pressure applied to the two wheel cylinders, respectively, and first and second outlet valves configured to control hydraulic pressure discharged from the two wheel cylinders to a reservoir storing a pressure medium, respectively, and
at least one of the first and second outlet valves is provided as an analog type valve.

11. The electronic braking system of claim 10, wherein the second hydraulic circuit comprises third and fourth inlet valves configured to control hydraulic pressure applied to the other two wheel cylinders, respectively, and third and fourth outlet valves configured to control hydraulic pressure discharged from the other two wheel cylinders to the reservoir, respectively.

12. An operation method of an electronic braking system according to claim 10, the operation method comprising:
a normal operation mode having
a regenerative braking mode in which two wheel cylinders arranged in the first hydraulic circuit perform regenerative braking with the generator,
wherein in the regenerative braking mode, hydraulic pressure is blocked from being transferred to the first hydraulic circuit by closing the second valve.

13. The operation method of claim 12, wherein in the regenerative braking mode, controlling an extent of opening of the first and second outlet valves to control braking pressure applied to the two wheel cylinders arranged in the first hydraulic circuit.

14. The electronic braking system of claim 10, further comprising:
   a first dump flow path connecting the first pressure chamber and the reservoir;
   a second dump flow path connecting the second pressure chamber and the reservoir;
   a first dump valve arranged in the first dump flow path to control the flow of a pressure medium such that a flow of the pressure medium in a direction from the reservoir to the first pressure chamber is allowed;
   a second dump valve arranged in the second dump flow path to control the flow of a pressure medium such that a flow of the pressure medium in a direction from the reservoir to the second pressure chamber is allowed; and
   a third dump valve arranged in a bypass flow path coupled in parallel with the second dump valve in the second dump flow path to control the flow of a pressure medium and provided as a solenoid valve to control bidirectional flows of the pressure medium between the reservoir and the second pressure chamber.

15. The electronic braking system of claim 14, further comprising:
   a master cylinder having first and second master chambers and first and second pistons arranged inside the first and second master chambers, respectively, and configured to discharge a pressure medium in response to a pedal effort on the brake pedal; and
   a reservoir flow path connecting the reservoir and the master cylinder.

16. The electronic braking system of claim 15, wherein the reservoir flow path comprises
   a first reservoir flow path connecting the first master chamber and the reservoir,
   a second reservoir flow path connecting the second master chamber and the reservoir,
   a reservoir check valve arranged in the first reservoir flow path to control the flow of a pressure medium such that a flow of the pressure medium in a direction from the reservoir to the first master chamber is allowed, and
   a check valve arranged in a bypass flow path coupled in parallel with the reservoir check valve in the first reservoir flow path to control the flow of a pressure medium and provided as a solenoid valve to control bidirectional flows of the pressure medium between the first master chamber and the reservoir.

17. The electronic braking system of claim 16, further comprising:
   a first backup flow path connecting the first master chamber and the first hydraulic circuit;
   a second backup flow path connecting the second master chamber and the second hydraulic circuit;
   a first cut valve arranged in the first backup flow path to control the flow of a pressure medium; and
   a second cut valve arranged in the second backup flow path to control the flow of a pressure medium.

18. The electronic braking system of claim 17, further comprising:
   a simulation device coupled to the master cylinder to provide reaction force against a pedal effort on the brake pedal; and
   a simulator valve configured to open or close a flow path between the master cylinder and the simulation device.

19. An operation method of an electronic braking system according to claim 17, the operation method comprising:
   an abnormal operation mode configured to link the first master chamber and the first hydraulic circuit by opening the first cut valve and link the second master chamber and the second hydraulic circuit by opening the second cut valve.

20. An operation method of an electronic braking system according to claim 17, the operation method comprising:
   a check mode configured to check whether there is a leakage in the master cylinder or the simulator valve,
   wherein in the check mode, the second cut valve is closed and the first cut valve is opened,
   the hydraulic pressure supplier is operated to create and apply hydraulic pressure to the first master chamber, and
   a value of hydraulic pressure of a pressure medium expected based on an amount of displacement of the hydraulic piston and a value of hydraulic pressure of a pressure medium applied to the first master chamber are compared.

\* \* \* \* \*